United States Patent
Yahagi et al.

(10) Patent No.: US 8,576,735 B2
(45) Date of Patent: Nov. 5, 2013

(54) BROADCAST SYSTEM, BROADCAST MANAGEMENT DEVICE, BROADCAST METHOD, AND TERMINAL

(75) Inventors: Masahiko Yahagi, Tokyo (JP); Satoru Kaneda, Tokyo (JP)

(73) Assignee: NEC Corporation, Tokyo (JP)

( * ) Notice: Subject to any disclaimer, the term of this patent is extended or adjusted under 35 U.S.C. 154(b) by 175 days.

(21) Appl. No.: 12/922,329

(22) PCT Filed: Mar. 24, 2009

(86) PCT No.: PCT/JP2009/055739
§ 371 (c)(1),
(2), (4) Date: Sep. 13, 2010

(87) PCT Pub. No.: WO2009/119535
PCT Pub. Date: Oct. 1, 2009

(65) Prior Publication Data
US 2011/0007659 A1    Jan. 13, 2011

(30) Foreign Application Priority Data
Mar. 28, 2008   (JP) .................................. 2008-086614

(51) Int. Cl.
*H04L 1/00* (2006.01)

(52) U.S. Cl.
USPC ............... 370/252; 370/310; 370/328; 725/9; 725/105; 725/118; 725/135; 725/148

(58) Field of Classification Search
USPC ......... 370/241, 252, 310, 328–338, 351, 389, 370/390, 464, 465, 473; 725/9–16, 105, 725/118–125, 135–153
See application file for complete search history.

(56) References Cited

U.S. PATENT DOCUMENTS

| | | | |
|---|---|---|---|
| 2002/0194607 A1 | 12/2002 | Connelly | |
| 2004/0226044 A1 | 11/2004 | Goode | |
| 2006/0117341 A1 | 6/2006 | Park | |
| 2006/0155892 A1 * | 7/2006 | Sudoh | 710/11 |
| 2008/0097863 A1 * | 4/2008 | Spiegelman | 705/26 |
| 2008/0242290 A1 * | 10/2008 | Bhatia et al. | 455/422.1 |

FOREIGN PATENT DOCUMENTS

| | | |
|---|---|---|
| CN | 1516971 A | 7/2004 |
| CN | 1701599 A | 11/2005 |
| EP | 1662682 A2 | 5/2006 |

(Continued)

OTHER PUBLICATIONS

International Search Report for PCT/JP2009/055739 mailed May 12, 2009.

(Continued)

*Primary Examiner* — Charles C Jiang

(57) ABSTRACT

Provided is a broadcast system that assigns a communication channel to a program and broadcasts data for the program to terminals, the broadcast system including a broadcast management device and a communication access network device. The management device calculates as a score a measure of viewing requests from users of the terminals for a plurality of programs, and determines a program to actually broadcast on the communication channel based on the score. The communication access network device transmits program data on a communication channel according to the determination of the broadcast management device.

12 Claims, 28 Drawing Sheets

(56) References Cited

FOREIGN PATENT DOCUMENTS

| | | | |
|---|---|---|---|
| JP | 9-121337 | A | 5/1997 |
| JP | 11-122598 | A | 4/1999 |
| JP | 2001285228 | A | 10/2001 |
| JP | 2001313922 | A | 11/2001 |
| JP | 2002084438 | A | 3/2002 |
| JP | 2003032649 | A | 1/2003 |
| JP | 2003069984 | A | 3/2003 |
| JP | 2005-123925 | A | 5/2005 |
| JP | 2005516474 | A | 6/2005 |
| JP | 2007-60470 | A | 3/2007 |
| JP | 2007174645 | A | 7/2007 |
| WO | 0064174 | A1 | 10/2000 |
| WO | 0115451 | A1 | 3/2001 |
| WO | 2006128151 | A | 11/2006 |
| WO | 2007087763 | A1 | 8/2007 |

OTHER PUBLICATIONS

Japanese Office Action for JJP2010-505648 mailed on Dec. 11, 2012.
Japanese Office Action for JP2010-505648 mailed on Mar. 12, 2013.
European search report for EP09726336.2 dated Sep. 27, 2012.
Japanese Office Action for JP 2010-505648 mailed on Jun. 4, 2013 with Partial English Translation.
Japanese Office Action for JP Application No. 2010-505648 mailed on Jun. 4, 2013 with Partial English Translation.
Japanese Office Action for JP Application No. 2010-505648 mailed on Dec. 11, 2013 with Partial English Translation.
Japanese Office Action for JP Application No. 2010-505648 mailed on Mar. 12, 2013 with Partial English Translation.
Chinese Office Action for CN Application No. 200980111283.4 issued on May 6, 2013 with English Translation.

* cited by examiner

| CHANNEL NO. | STATUS | BROADCAST CONTENT INFORMATION | SCORE |
|---|---|---|---|
| CH1 | CURRENTLY BROADCAST | BASEBALL | 20 |
| CH2 | OUT OF SERVICE | SOCCER | 10 |
| CH3 | OUT OF SERVICE | TENNIS | 8 |
| CH4 | CURRENTLY BROADCAST | WRESTLING | 15 |
| ⋮ | ⋮ | ⋮ | ⋮ |

Fig.12

| TERMINAL ID | VIEWED CH | REQUESTED CH |
|---|---|---|
| 1 | 1 | 1 |
| ... | ... | ... |
| 19 | 1 | 1 |
| 20 | 1 | 2 |
| 21 | 1 | 2 |
| 22 | 1 | 2 |
| 23 | 1 | 3 |
| 24 | 1 | 3 |
| 25 | 1 | 3 |
| 26 | 1 | 4 |
| 27 | 4 | 1 |
| 28 | 4 | 1 |
| 29 | 4 | 2 |

(Brackets: 19, 3, 3)

| TERMINAL ID | VIEWED CH | REQUESTED CH |
|---|---|---|
| 30 | 4 | 2 |
| 31 | 4 | 3 |
| 32 | 4 | 3 |
| 33 | 4 | 3 |
| 34 | 4 | 1 |
| ... | ... | ... |
| 50 | 4 | 1 |
| 51 | SBY | 2 |
| ... | ... | ... |
| 55 | SBY | 2 |
| 56 | SBY | 3 |
| ... | ... | ... |
| 62 | SBY | 3 |

(Brackets: 3, 17, 5, 7)

Fig.15

| VIEWED CH | REQUESTED CH | NUMBER OF REPORTS |
|---|---|---|
| 1 | — | 19 |
| 1 | 2 | 3 |
| 1 | 3 | 3 |
| 1 | 4 | 1 |
| 4 | 1 | 2 |
| 4 | 2 | 2 |
| 4 | 3 | 3 |
| 4 | — | 17 |
| SBY | 1 | 0 |
| SBY | 2 | 5 |
| SBY | 3 | 7 |
| SBY | 4 | 0 |

Fig.16

| VIEWED CH | REQUESTED CH | NUMBER OF REPORTS |
|---|---|---|
| 1 | — | 19 |
| 4 | 1 | 2 |
| SBY | 1 | 0 |
| 1 | 2 | 3 |
| 4 | 2 | 2 |
| SBY | 2 | 5 |
| 1 | 3 | 3 |
| 4 | 3 | 3 |
| SBY | 3 | 7 |
| 1 | 4 | 1 |
| 4 | — | 17 |
| SBY | 4 | 0 |

Fig.17

| VIEWED CH | REQUESTED CH | NUMBER OF REPORTS |
|---|---|---|
| 1 | — | 19 |
| 1 | 2 | 5 |
| 1 | 3 | 3 |
| 1 | 4 | 1 |
| 4 | 1 | 2 |
| 4 | 2 | 4 |
| 4 | 3 | 3 |
| 4 | — | 13 |
| SBY | 1 | 0 |
| SBY | 2 | 8 |
| SBY | 3 | 7 |
| SBY | 4 | 0 |

Fig.18

| VIEWED CH | REQUESTED CH | NUMBER OF REPORTS |
|---|---|---|
| 1 | — | 19 |
| 4 | 1 | 2 |
| SBY | 1 | 0 |
| 1 | 2 | 5 |
| 4 | 2 | 4 |
| SBY | 2 | 8 |
| 1 | 3 | 3 |
| 4 | 3 | 3 |
| SBY | 3 | 7 |
| 1 | 4 | 1 |
| 4 | — | 13 |
| SBY | 4 | 0 |

Fig.19

| PROGRAM | NUMBER OF VIEWS | NUMBER OF REQUESTS | NUMBER OF OTHER-CHANNEL REQUESTS | SCORE |
|---|---|---|---|---|
| 1 | 26 | 2 | 7 | 21 |
| 2 | 0 | 10 | 0 | 10 |
| 3 | 0 | 13 | 0 | 13 |
| 4 | 24 | 1 | 7 | 18 |

| PROGRAM | NUMBER OF VIEWS | NUMBER OF REQUESTS | NUMBER OF OTHER-CHANNEL REQUESTS | SCORE |
|---|---|---|---|---|
| 1 | 28 | 2 | 9 | 21 |
| 2 | 0 | 17 | 0 | 17 |
| 3 | 0 | 13 | 0 | 13 |
| 4 | 22 | 1 | 9 | 14 |

| Ch_No. | Program_Name | Status | Score | Action_Time |
|---|---|---|---|---|
| 1 | Baseball | Viewing | 21 | - |
| 2 | Soccer | No View | 10 | - |
| 3 | Tennis | No View | 13 | - |
| 4 | Wrestling | Viewing | 18 | - |

Fig.22

| Ch_No. | Program_Name | Status | Score | Action_Time |
|---|---|---|---|---|
| 1 | Baseball | Viewing | 21 | - |
| 2 | Soccer | Beginning | 17 | 120 |
| 3 | Tennis | No View | 13 | - |
| 4 | Wrestling | Completing | 14 | 120 |

Fig.23

| Ch | status | program | Score | Req |
|----|--------|---------|-------|-----|
| 1: | Viewing | Baseball | 21 | |
| 2: | No view | Soccer | 10 | R |
| 3: | No view | Tennis | 13 | |
| 4: | Viewing | Wrestling | 18 | |

Fig.24

| Ch | status | program | Score | Req |
|---|---|---|---|---|
| 1: | Viewing | Baseball | 21 | |
| 2: | Beginning | Soccer | 17 | R |
| 3: | No view | Tennis | 13 | |
| 4: | Completing | Wrestling | 14 | |

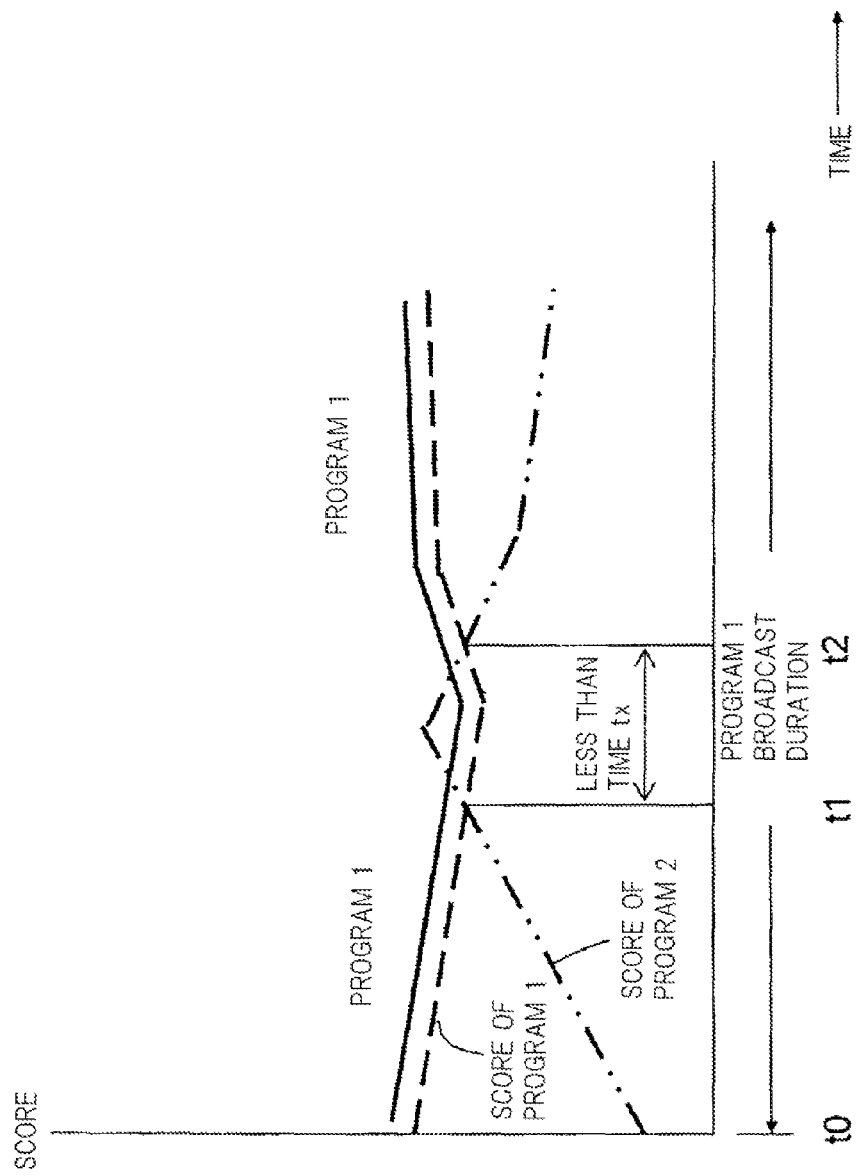

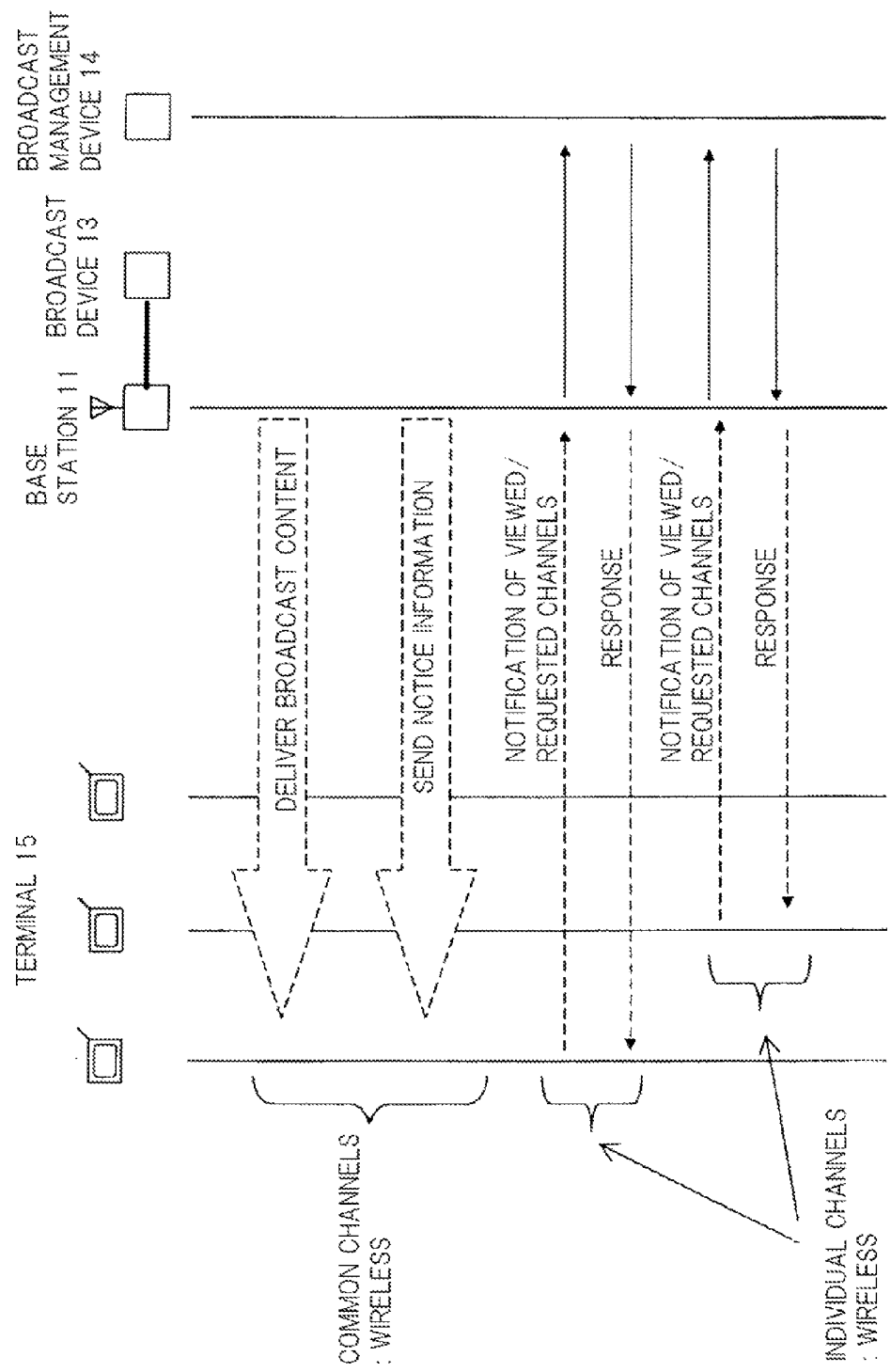

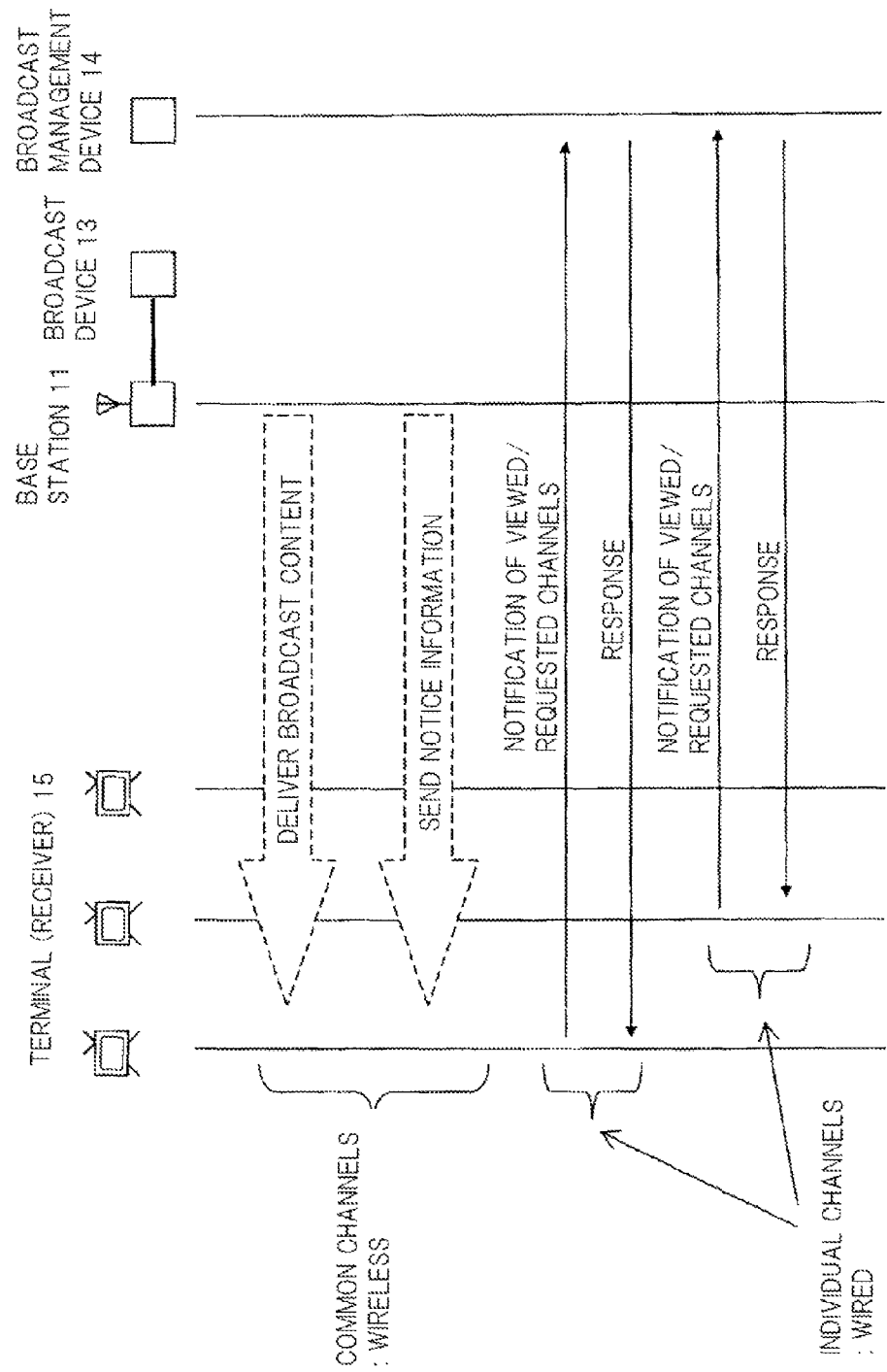

BROADCAST SYSTEM, BROADCAST MANAGEMENT DEVICE, BROADCAST METHOD, AND TERMINAL

The present application is the National Phase of PCT/JP2009/055739, filed Mar. 24, 2009, which claims the benefit of priority based on Japanese Patent Application No. 2008-086614 filed on Mar. 28, 2008, disclosure of which is hereby incorporated by reference in its entirety.

TECHNICAL FIELD

The present invention relates to a data communication technique for delivering same data to a number of terminals in a communication system.

BACKGROUND ART

In a wireless communication system that covers its communication area with cells formed by wireless base stations, positioning of multiple cells enables communication between wireless terminals over a large area. In Worldwide Interoperability for Microwave Access (WiMAX), communication at various places is enabled by covering a communication area with small size cells called femtocells. There is a form of communication in which program data is broadcast to multiple wireless terminals in this type of wireless communication system (see JP2005-516474A and JP2007-174645A).

In a band available for a wireless communication system, multiple wireless channels are defined, from which a wireless channel for broadcasting programs is selected. On the selected wireless channel, program data is broadcast from a wireless base station. A user can watch the program by receiving data on the wireless channel on which the program is broadcast with a wireless terminal.

General wireless terminals for viewing broadcasts of this kind include fixed terminals represented by home radios or televisions and mobile terminals that can be carried by users. Also, schemes for broadcasting programs include a scheme which releases programs in advance prior to their broadcast and carries out broadcast according to the programs as well as a scheme which temporarily changes programs for announcing an emergency or for extending a program that is currently on air.

In a wireless communication system, however, radio resources are limited. Besides, because wireless channels are also used for point-to-point calls, the number of wireless channels available for program broadcast is further limited.

Meanwhile, in view of the situation in which wireless channels available for program broadcast are not sufficient despite a host of programs, it is desirable to have a communication scheme to select some provided programs and broadcast only the selected programs.

As an example, when there are ten programs and each of the programs requires a radio band of 1 MHz, a radio band of 10 MHz is necessary for broadcasting all the programs. In reality, however, such a situation is possible where only a radio band of 3 MHz is available. In such a case, three out of the ten programs would have to be selected.

One method of selection is to broadcast programs as previously scheduled without consideration of users' preferences. In this method, users can reliably learn when and which programs are broadcast by referring to a program table published beforehand. However, programs really desired by users are less likely to be broadcast. Although there is a technique to take into account users' preferences in selection of broadcast programs (see JP2001-313922A (paragraphs 0023 and 0024)), the technique does not reflect users' preferences in broadcast programs in real time.

While the descriptions here illustrate a wireless communication system as an example, broadcast of program data is similarly performed in a wired communication system as well. In addition, that the communication resources may be limited is also true for a wired communication system.

DISCLOSURE OF THE INVENTION

Since the number of communication channels available for program broadcast is limited in such a communication system as mentioned above, it is not possible to assign wireless channels to all the programs at all times when the number of programs increases. As a possible measure, users' preferences can be summarized in some way and programs can be selected based on the result of summarization. A problem is, however, how to summarize users' requests and reflect the requests in selection of broadcast programs.

An object of the present invention is to provide a technique that enables users' requests to be appropriately reflected in the selection of broadcast programs in a broadcast system which selectively broadcast programs.

To attain the object, a broadcast system according to an aspect of the present invention is a broadcast system that assigns a communication channel to a program and broadcasts data for the program to terminals, the system including:

a broadcast management device that calculates as a score a measure of viewing requests from users of the terminals for a program that is being actually broadcast on the communication channel and a program that is not being actually broadcast but can be broadcast, and that updates the program that is to be actually broadcast on the communication channel by selecting from the program that is being actually broadcast on the communication channel and a program that is not actually being broadcast but can be broadcast based on the score calculated; and a communication access network device that, upon the program to be actually broadcast on the communication channel being updated by the broadcast management device, broadcasts on the communication channel data for the program selected as the program to be broadcast.

A broadcast management device according to an aspect of the invention is a broadcast management device that manages programs to broadcast in a broadcast system which assigns a communication channel to a program and broadcasts data for the program to terminals, the broadcast management device including:

score calculating means for calculating as a score a measure of viewing requests from users of the terminals for a program that is actually being broadcast on the communication channel and a program that is not being actually broadcast but can be broadcast; and determination means for updating the program to be actually broadcast on the communication channel by selecting from among the program that is being actually broadcast on the communication channel and the program that is not actually being broadcast but can be broadcast based on the score calculated by the score calculating means.

A broadcast method according to an aspect of the invention is a broadcast method for assigning a communication channel to a program and broadcasting data for the program to terminals, the method including the steps of:

calculating as a score a measure of viewing requests from users of the terminals for a program that is actually being broadcast on the communication channel and a program that is not being actually broadcast but can be broadcast;

updating the program that is to be actually broadcast on the communication channel by selecting from among the program that is being actually broadcast on the communication channel and the program that is not actually being broadcast but can be broadcast based on the score calculated; and upon updating the program to be actually broadcast on the communication channel, broadcasting on the communication channel data for the program selected as the programs to be broadcast.

BRIEF DESCRIPTION OF THE DRAWINGS

FIG. 12 shows an example of program viewing and requesting states of each of the wireless terminals present in the coverage area of the base station device at a certain time;

FIG. 15 is a tabular representation of the state shown in FIG. 13;

FIG. 16 is a table that re-sorts the table of FIG. 15;

FIG. 17 is a tabular representation of the state shown in FIG. 14;

FIG. 18 is a table that re-sorts the table of FIG. 17;

FIG. 19 is a diagram illustrating a process of calculating each of program scores in the state of FIG. 13 (and FIGS. 15, 16);

FIG. 20 is a diagram illustrating a process of calculating each of program scores in the state of FIG. 14 (and FIGS. 17, 18);

FIG. 21 shows an example of notice information sent to a wireless terminal;

FIG. 22 shows an example of notice information sent to a wireless terminal after a certain time period from FIG. 21;

FIG. 23 shows an example of a screen display on a wireless terminal that has received the notice information of FIG. 21;

FIG. 24 shows an example of a screen display on a wireless terminal that has received the notice information of FIG. 22;

FIG. 29 is a diagram illustrating a case where a program switching does not occur as a result of applying time protection;

FIG. 30 shows illustrative signal transfer using wireless channels for both transfer of broadcast content and notice information, and transfer of terminal-specific information; and FIG. 31 shows illustrative signal transfer using wireless channels for transfer of broadcast content and notice information, and wired channels for transfer of terminal-specific information.

BEST MODE FOR CARRYING OUT THE INVENTION

An exemplary embodiment for implementing the invention will be described in detail with reference to the drawings.

Figure 1:
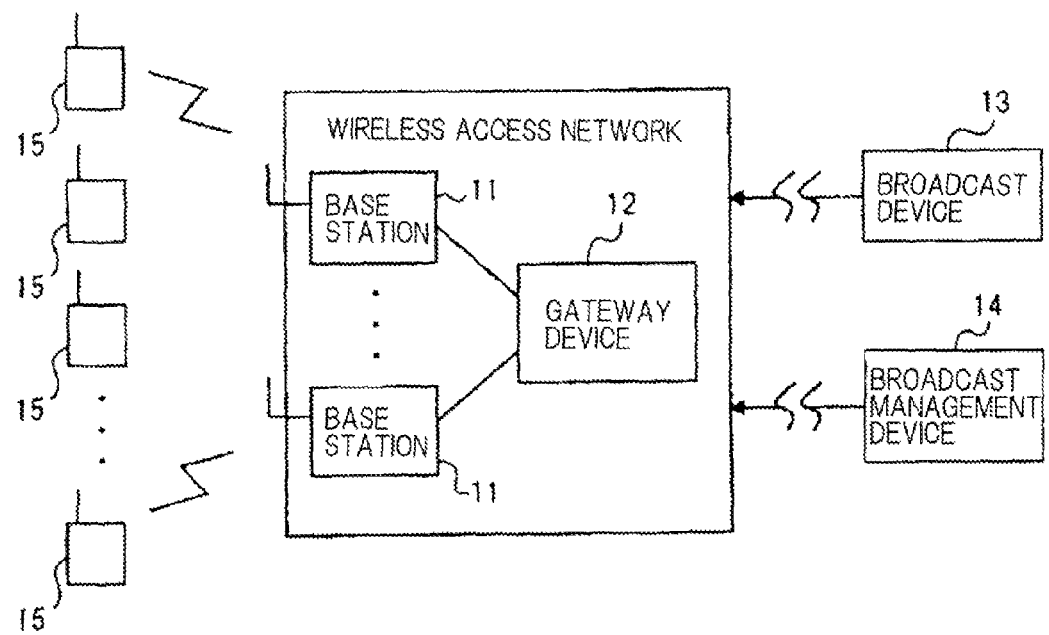
FIG. 1 is a block diagram showing a configuration of a broadcast system according to an exemplary embodiment.

FIG. 1 is a block diagram showing a configuration of a broadcast system according to the exemplary embodiment. Referring to FIG. 1, the broadcast system includes base station devices 11, gateway device 12, broadcast device 13, and broadcast management device 14. Base station devices 11 and gateway device 12 form wireless access network 16. Base station devices 11 transmit and receive data to/from wireless terminals 15 on wireless channels.

The broadcast system of the present exemplary embodiment supports bi-directional point-to-point communication typified by voice calls as well as broadcast-type communication for broadcasting program data to multiple wireless terminals 15 from base station device 11. Broadcast device 13 and broadcast management device 14 are devices for realizing broadcast of programs.

Broadcast device 13 outputs program data. Data output from broadcast device 13 is sent to, for example, base station devices 11 by way of a network not shown and gateway device 12. Program data is broadcast from base station devices 11 to wireless terminals 15 on wireless channels, but because the number of wireless channels between base station devices 11 and wireless terminals 15 is limited, wireless channels may not be assigned to all programs.

Wireless terminal 15 is a device that sends and receives data via base station device 11 to realize communication desired by a user. As for programs, wireless terminal 15 is capable of selecting a program desired by the user from multiple programs broadcast from base station device 11 on wireless channels and receiving data for that program. The user thus can view the desired program. Wireless terminal 15 also sends to broadcast management device 14 via base station device 11 a viewing request message that contains request information indicating a program the user watches or a program the user wants to watch which is selected from programs broadcast on wireless channels from base station device 11 and from programs that are not being actually broadcast but can be broadcast.

A viewing request message may be sent when the user performs an operation for starting or terminating viewing of a program, or when the user performs an operation for changing the program he is watching, for example. A viewing request message may also be sent when wireless terminal 15 has entered a coverage area of a certain base station device 11 during viewing of a program, or when wireless terminal 15 has exited the area. Or as another example, a viewing request massage may be sent at certain time intervals.

Broadcast management device 14 selects programs that are to be actually broadcast on wireless channels from programs output from multiple broadcast devices 13. Programs output from broadcast device 13 include programs that are actually being broadcast on wireless channels and programs that are not currently being broadcast but can be broadcast. A result of selection made on broadcast management device 14 is provided to base station device 11 via a network not shown and gateway device 12.

To select programs to broadcast, broadcast management device 14 always manages programs being output from broadcast device 13, and also calculates as a score how much requests for viewing are made for each program based on request information provided by wireless terminals 15 in viewing request messages. The viewing request may also contain an indication of how much views there are for programs that are currently broadcast. Broadcast management device 14 then determines programs to be broadcast according to each of the scores of programs.

Specifically, broadcast management device 14 may select a number of programs that can be broadcast in descending order of score, for example. If programs determined based on scores differ from programs currently being broadcast, programs to be broadcast are changed.

Also, because too frequent changing of broadcast programs based on simple comparison of scores would conversely cause inconvenience to users, protection for slowing down the frequency of change in broadcast programs may be effected. For example, broadcast programs may be changed when the score of a program that is not being broadcast has exceeded the score of a program currently being broadcast plus a predetermined protection value. Alternatively, broadcast programs may be changed when the score of a program has been continuously satisfying a condition for changing programs for a predetermined protection time period or longer.

Gateway device 12 is a gateway for connecting each base station device 11 to a network not shown.

Figure 2:
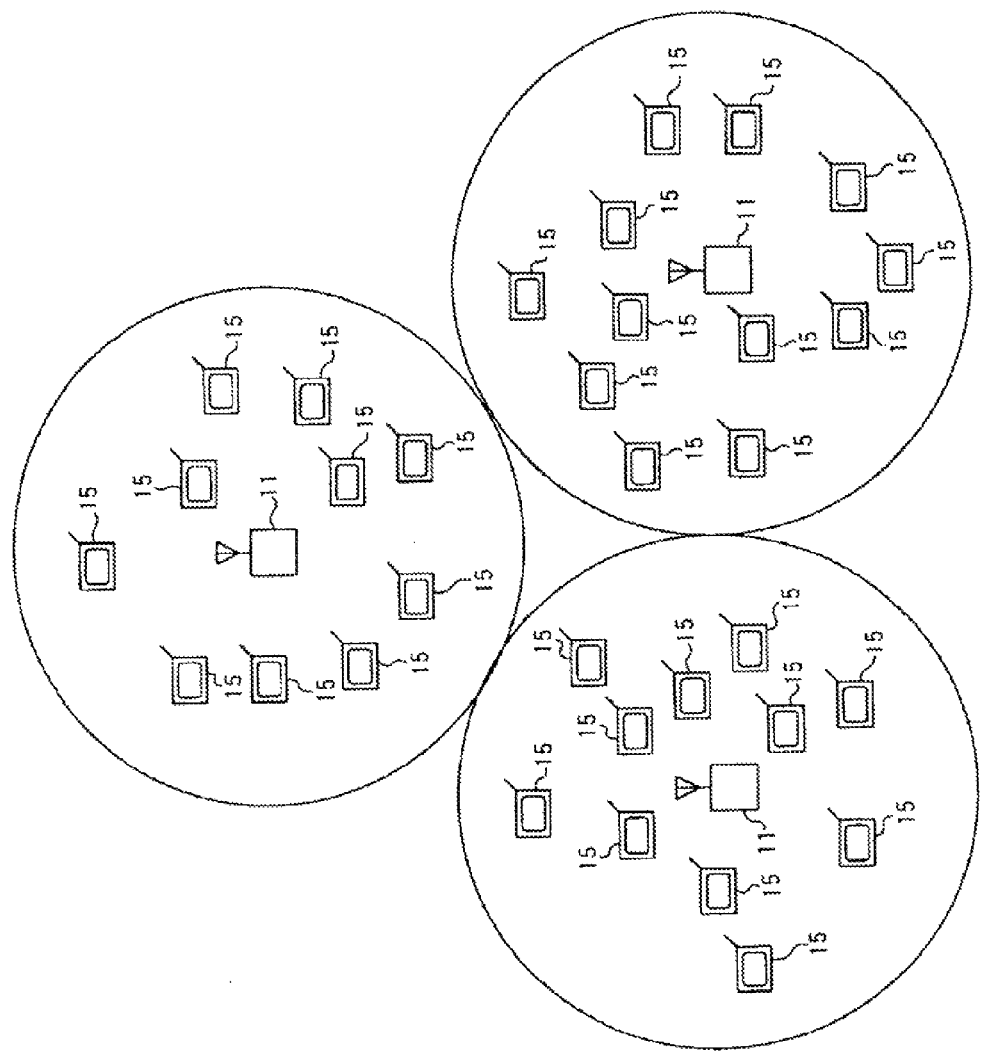
FIG. 2 illustrates communication areas covered with a plurality of base station devices.

Base station device 11 is a device that sends and receives data to/from wireless terminal 15 through a wireless channel. By covering a communication area with cells of multiple base station devices 11 as illustrated in FIG. 2, communication by wireless terminal 15 at various places is enabled. As for broadcast programs, base station device 11 broadcasts data for programs selected by broadcast management device 14 on a wireless channel.

Gateway device 12 may manage assignment of wireless channels of base station devices 11 and assign wireless channels to broadcast programs from broadcast device 13 according to decision by broadcast management device 14. In that case, base station device 11 can broadcast program data on wireless channels according to assignment by gateway device 12.

Figures 3, 4:
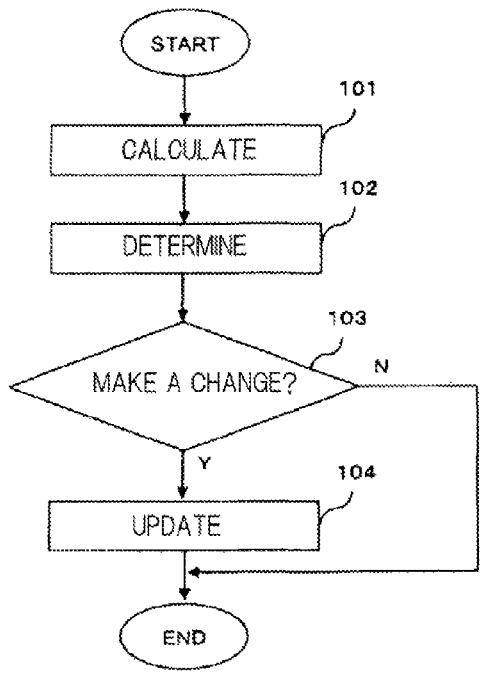
FIG. 3 is a flowchart illustrating a broadcast program update process performed by the broadcast system according to the exemplary embodiment.
FIG. 4 is a table showing an example of the result of calculating scores of each of programs.

FIG. 3 is a flowchart illustrating a broadcast program update process performed by the broadcast system according to the present exemplary embodiment. Referring to FIG. 3, broadcast management device 14 of the broadcast system calculates the score of each program based on request information provided by wireless terminals 15 (step 101).

FIG. 4 shows a table illustrating an example of the result of calculating each of the scores of programs. In the example of FIG. 4, four programs on CH1 to CH4 are output from broadcast device 13. CH1 is broadcasting a baseball game and has a score of 20. Broadcast on CH2 is a soccer game and has a score of 10. Broadcast on CH3 is a tennis match and has a score of 8. Broadcast on CH4 is a wrestling match and has a score of 15.

Referring back to FIG. 3, broadcast management device 14 then determines programs to broadcast on wireless channels based on each of the scores of programs (step 102). If there is a change of broadcast programs (YES at step 103), broadcast management device 14 notifies gateway device 12 of the change and updates broadcast programs (step 104). If there is no change of programs to broadcast (NO at step 103), the process is then terminated. In the example of FIG. 4, it is assumed that the number of programs that can be broadcast on wireless channels is two. The programs on CHs 1 and 4 are being broadcast and programs on CHs 2 and 3 are not. Because there has been no reversal of scores, programs to be broadcast are not changed.

Figure 5:
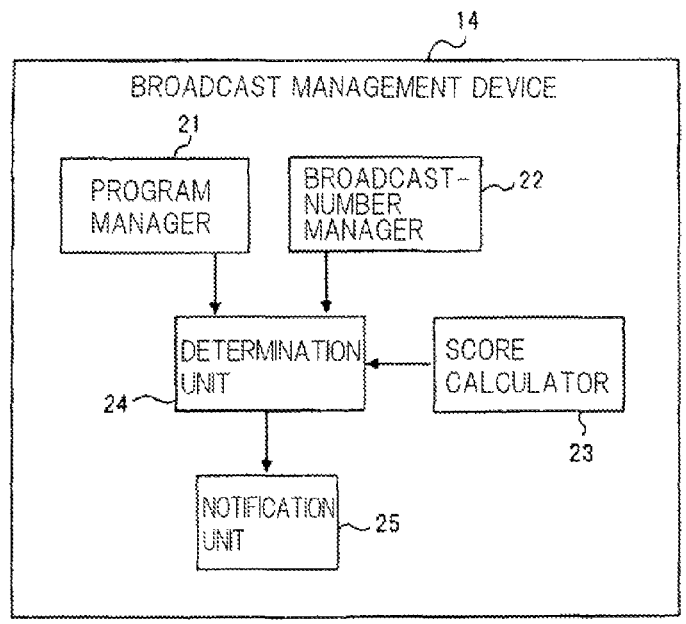
FIG. 5 is a block diagram showing a configuration of broadcast management device 14 according to the exemplary embodiment.

FIG. 5 is a block diagram showing a configuration of broadcast management device 14 of the present exemplary embodiment. Referring to FIG. 5, broadcast management device 14 includes program manager 21, broadcast-number manager 22, score calculator 23, determination unit 24, and notification unit 25.

Program manager 21 manages information on programs that are output from broadcast device 13 (broadcast information). Broadcast information includes a program broadcast schedule, for example. From the information, the start or end time of each program can be found out.

Broadcast-number manager 22 manages the number of broadcast programs that can be assigned a wireless channel and that can be actually broadcast. The number of such broadcast programs may be either a fixed value or a value that varies depending on the assignment of wireless channels on base station device 11.

Score calculator 23 calculates the score of each program currently output from broadcast device 13. The score of each program is counted based on request information provided by wireless terminals 15.

For a program that is being broadcast, actual viewing thereof is regarded as a viewing request, for example: the score of the program may be incremented by one when a user has started to view the program or when wireless terminal 15 on which the program is being viewed has entered an area. Likewise, the score of the program may be decremented by one when a user has finished viewing the program or when wireless terminal 15 on which the program is being viewed has gone outside the area, for example.

For a program that is not being broadcast, its score may be incremented by one when a user makes an operation for requesting viewing of the program, for example. Likewise, the score of the program may be decremented by one when a user who has requested viewing of the program has cancelled his viewing request or requests viewing of another program.

Determination unit 24 selects programs equal to the number of broadcast programs that has been determined under management of broadcast-number manager 22 from among programs managed by program manager 21, based on scores calculated by score calculator 23. Selection of broadcast programs may be based on simple comparison of scores or may be protected by applying a protection number for scores or a protection time regarding timing of program change.

Notification unit 25 notifies base station device 11 or gateway device 12 of a change of programs to be broadcast when such a change has been determined by determination unit 24.

Figure 6:
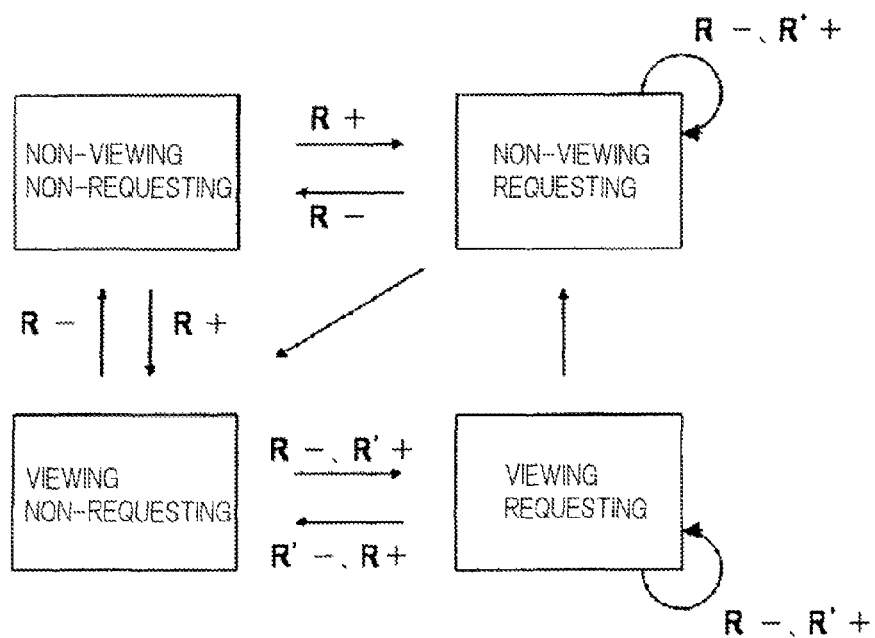
FIG. 6 is a diagram illustrating how each of program scores calculated by score calculator 23 changes depending on state of wireless terminal 15.

FIG. 6 is diagram for illustrating how each of scores of programs calculated by score calculator 23 varies depending on the state of wireless terminal 15.

Wireless terminal 15 can be in a state in which a program is being viewed thereon and a state in which no program is being viewed, and in each of the two states, a state in which a program is being requested and a state in which no program is being requested. For simplicity, these states will be referred as follows: a state in which a program is being viewed will be called "viewing" state and a state in which no program is being viewed will be called "non-viewing" state. A state in which another program is being requested will be called "requesting" state and a state in which no other program is being requested will be called "non-requesting" state.

And combinations of these states will be called as follows. A state in which no program is being viewed and no program is being requested will be called "non-viewing and non-requesting" state; a state in which no program is being viewed but a program is being requested will be called "non-viewing and requesting" state; a state in which a program is being viewed and no other program is being requested will be called "viewing and non-requesting" state; and a state in which a program is being viewed but another program is being requested will be called "viewing and requesting" state.

When there is a change in the state of wireless terminal 15, the score of program(s) changes. Also, when wireless terminal 15 in any of such states moves between areas, program scores in the source and destination areas change. In FIG. 6, arrows represent changes in state, and score variation as a result of a state change is indicated near the arrows. "R" and "R'" represent a program currently being viewed or requested, "+" denotes an increment of a score, and "−" denotes a decrement of a score.

For describing scores in these states, the state of wireless terminal 15 present in a particular area will be discussed first.

A score is not counted when wireless terminal 15 in "non-viewing and non-requesting" state.

When wireless terminal 15 transitions from non-viewing and non-requesting to viewing and non-requesting state, the score of the program which is now being viewed is incremented by one. This corresponds to when a user has started to watch a program.

When wireless-terminal 15 transitions from viewing and non-requesting state to non-viewing and non-requesting state, the score of the program that was being viewed is decremented by one. This represents a case where the user stops viewing a program without requesting any other program.

When wireless terminal 15 transitions from non-viewing and non-requesting to non-viewing and requesting state, the score of the requested program is incremented by one. This is caused by the user seeing a terminal indication described below and starting to request a program he wants to watch.

When wireless terminal 15 transitions from non-viewing and requesting to non-viewing and non-requesting state, the score of the program that was being requested is decremented by one. This occurs as a result of the user giving up viewing a program he has wanted to watch.

When wireless terminal 15 transitions from viewing and non-requesting to viewing and requesting state, the score of the program that has been viewed is decremented by one and the score of the program being requested is incremented by one. This is caused by the user wanting to view a different program. In this case, the score of the program that is being viewed is decremented on the assumption that the program the user is now watching is watched expediently and is not really desired by the user.

When wireless terminal 15 transitions from viewing and requesting to a viewing and non-requesting state, the score of the program that has been viewed is incremented by one and the score of the program that was being requested is decremented by one. This corresponds to when the user wanted to watch a different program from the current one but found that the current program was the program he wants to watch.

When wireless terminal 15 transitions from viewing and requesting to a non-viewing and requesting state, neither the score of the program that was being viewed nor the score of the program that has been requested change. This corresponds to a case where the user was watching a program that the user did not desire and stopped viewing the program because a program the user was requesting did not start. In this case, the scores do not change because the program requested by the user remains unchanged.

When wireless terminal 15 transitions from non-viewing and requesting to a viewing and non-requesting state, the score of the program that was being requested is equivalent to the score of the program that is currently being viewed and there is no change in score. This is caused by transition from a non-viewing to a viewing state as a result of the user seeing a terminal indication described below to learn that the program the user requested has become available for viewing or by an internal mechanism inside wireless terminal 15 detecting that the requested program is now available for viewing. In this case, there is no change in score because the program the user wants to watch remains unchanged.

When wireless terminal 15 changes the program it requests while in a viewing and requesting state, the score of the program for which a request has been canceled is decremented by one and the score of the program newly requested is incremented by one.

When wireless terminal 15 changes the program it requests while in a non-viewing and requesting state, the score of the program for which a request has been canceled is decremented by one and the score of the program newly requested is incremented by one.

Figure 7:
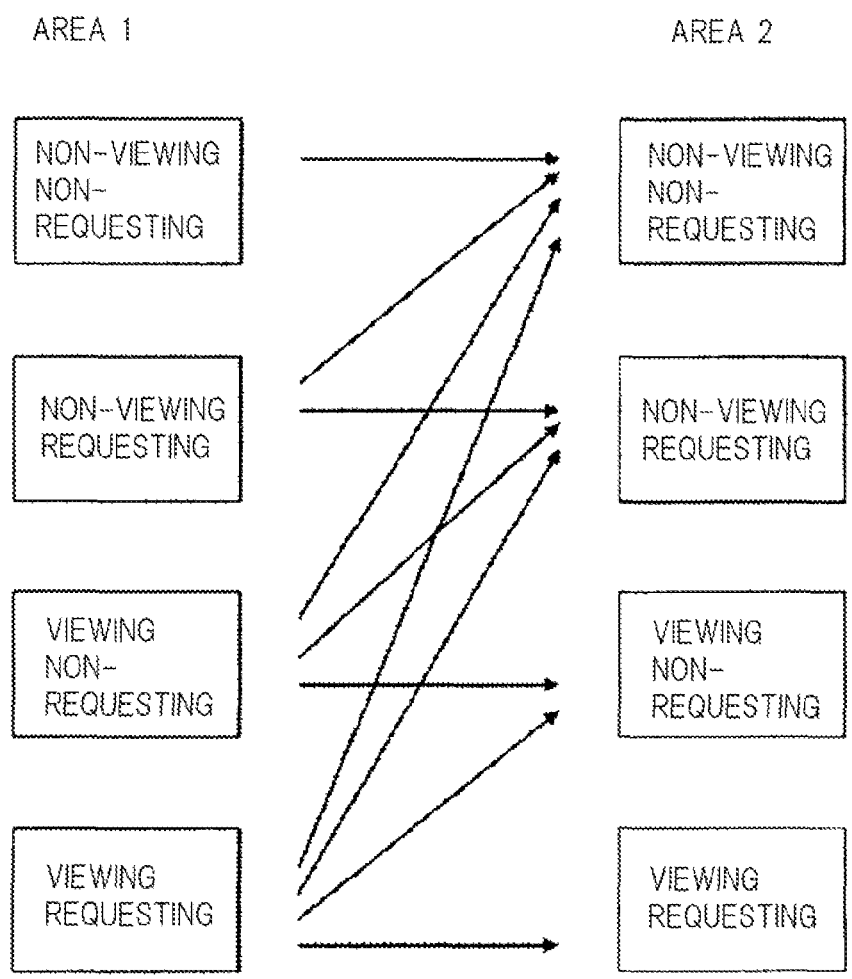
FIG. 7 is a diagram illustrating how scores change when wireless terminal IS moves between areas.

Now, variation in scores that occurs when wireless terminal 15 moves between areas will be described. FIG. 7 is a diagram illustrating how scores change when wireless terminal 15 moves between areas. In FIG. 7, arrows represent state transitions caused by wireless terminal 15 moving between areas.

Descriptions will be given on the movement of wireless terminal 15 from one area to another area in one of the two viewing states and in one of the two requesting states. Program scores in each of the source and destination areas are independent of each other. When wireless terminal 15 moves, the score of a program that has been requested in the source area is decremented as a result of wireless terminal 15 leaving the area. In the destination area, in response to the entry of wireless terminal 15, the score of a program that was being requested in the source area may be incremented, or when the program is not defined in the destination area, the score of the program may not be incremented. It is assumed that wireless terminal 15 moves from area 1 to area 2, and the state of wireless terminal 15 in area 1 will be described for four states, i.e., non-viewing and non-requesting, non-viewing and requesting, viewing and non-requesting, and viewing and requesting another program.

When wireless terminal 15 that is non-viewing and non-requesting in area 1 moves to area 2, there is no change in program scores.

When wireless terminal 15 that is in non-viewing and requesting state in area 1 moves to area 2, wireless terminal 15 can transition to one of two states, that is, a non-viewing and non-requesting state and a non-viewing and requesting state.

A reason for transitioning to a non-viewing and non-requesting state in area 2 is that the program that wireless terminal 15 was requesting in area 1 is not able to broadcast in area 2. In this case, the score of the program that was being requested in area 1 is decremented and the score of no program is incremented in area 2. When wireless terminal 15 transitions to non-viewing and requesting state in area 2 as in area 1, the score of the program that was being requested in area 1 is decremented and the score of the same program is incremented in area 2.

When wireless terminal 15 that is in a viewing and non-requesting state in area 1 moves into area 2, wireless terminal 15 can transition to one of three states: non-viewing and non-requesting, non-viewing and requesting, and viewing and non-requesting states. A reason for transitioning to non-viewing and non-requesting state in area 2 is that the program that was being viewed in area 1 cannot be requested in area 2 because the program is not being broadcast or is not able to be broadcast in area 2. In this case, the score of the program that was being viewed in area 1 is decremented and no program score is incremented in area 2. A reason for transitioning to a non-viewing and requesting state in area 2 is that the program that was being viewed in area 1 is not currently broadcast in area 2 but is not able to be broadcast and thus can be requested. In this case, the score of the program that was being viewed in area 1 is decremented and also incremented for the reason that the same program is requested in area 2. A reason for transitioning to a viewing and non-requesting state in area 2 is that the same program as in area 1 can be viewed in area 2. In this case, the score of the program that was being viewed in area 1 is decremented and the score of the same program is incremented in area 2.

When a terminal that is in a viewing and requesting state in area 1 moves to area 2, the terminal can transition to one of four states: non viewing and non-requesting, non-viewing and requesting, viewing and non-requesting, and viewing and requesting states. A reason for transitioning to a non-viewing and non-requesting state in area 2 is that the program that was being viewed in area 1 is not currently being broadcast or is not able to be broadcast in area 2 and thus cannot be requested. In this case, the score of the program that was being requested in area 1 is decremented and the score of no program is incremented in area 2. A reason for transitioning to a non-viewing and requesting state in area 2 is that the program that was being viewed in area 1 is not currently being broadcast in area 2 but the program that was being requested in area 1 is able to be broadcast in area 2 and thus can be continued to be requested. In this case, the score of the program that was being requested in area 1 is decremented and then incremented as the same program is requested in area 2. A reason for transitioning to a viewing and non-requesting state in area 2 is that the program that was being viewed in area 1 is currently being broadcast in area 2 but the program that was being requested is not able to be broadcast in area 2. In this case, the score of the program that was being requested in area 1 is decremented, and the score of the currently viewed program is incremented in area 2 regarding that the program is requested. Another reason for transitioning to a viewing and non-requesting in area 2 is that the program that was being viewed in area 1 is not being broadcast in area 2 now but a program that was being requested is able to be broadcast in area 2, so the user is encouraged to watch the program that the user has requested. In this case, the score of the program that was being requested in area 1 is decremented and the score of no program is incremented in area 2.

As described above, the present exemplary embodiment calculates scores for multiple programs that represent how much the programs are viewed or how much viewing requests are made for the programs, and updates programs that are actually broadcast on wireless channels based on the scores. Therefore, limited wireless channels can be efficiently used and programs highly requested by users can be selected and broadcast.

In the broadcast system of the present exemplary embodiment, wireless terminals 15 may be notified of each of program scores calculated by broadcast management device 14 via wireless access network 16 as notice information. In that case, a result of calculation by score calculator 23 may be provided by notification unit 25 by broadcast, for example. By wireless terminal 15 indicating the status of individual programs on a screen based on the notice information, the user can learn the status of the program he is now watching or a program for which the user has made a viewing request. Status of a program may be information including its scheduled start and end of broadcast or the score of the program itself.

In the present exemplary embodiment, broadcast management device 14 is located outside wireless access network 16 and sends decisions made on device 14 to wireless access network 16. However, this is not limitative. As another example, broadcast management device 14 may also be integrated into gateway device 12 or base station device 11.

A more specific exemplary embodiment will be shown in the following.

The broadcast system according to the exemplary embodiment has such a configuration as shown in FIG. 1, and multiple base station devices 11 are positioned in the system as illustrated in FIG. 2.

Figure 8:
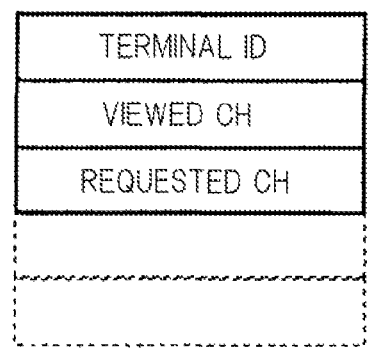
FIG. 8 shows a format of a viewing request message sent from wireless terminal 15.

In this exemplary embodiment, notice information provided by wireless terminal 15 includes a channel that the user is actually watching (a viewed channel) and a channel the user wants to watch (a requested channel). FIG. 8 shows a format of a viewing request message sent from wireless terminal 15. Referring to FIG. 8, a viewing request message is in a format that can indicate a viewed channel (Viewed CH) and a requested channel (Requested CH) as notice information together with a terminal ID (Identifier). In a viewing request message from wireless terminal 15, the viewing and requesting status of programs by the user of wireless terminal 15 is indicated. The content of the viewing request message may be based on the following patterns, for example:

(1) When the user is viewing a certain broadcast program and requesting the same program; Viewed CH="viewed channel", and Requested CH="unspecified" or "viewed channel".

(2) When the user is viewing a certain broadcast program and requesting a different program; Viewed CH="viewed channel" and Requested CH="requested channel".

(3) When the user is neither viewing nor requesting a program; Viewed CH="unspecified" and Requested CH="unspecified".

(4) When the user is not viewing a program and requesting viewing of any program; Viewed CH="unspecified" and Requested CH="requested channel".

Figure 9:
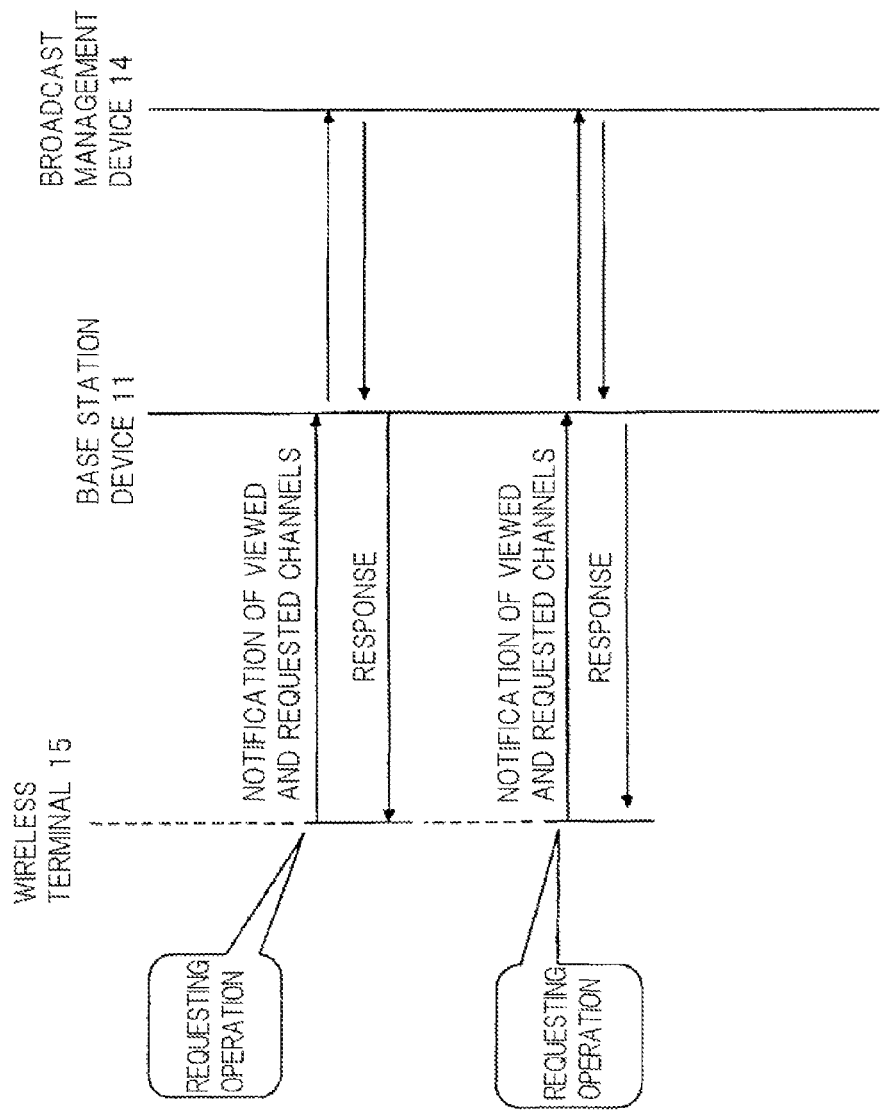
FIG. 9 shows an example of a signal sequence between a wireless terminal and a base station device that takes place when a user updates his requested channel.

FIG. 9 shows an example of a signal sequence between a wireless terminal and a base station device performed when the user has updated the requested CH. The requested channel is updated when the user changes the requested channel or cancels a viewing request for a program, for example. Referring to FIG. 9, notification of viewed and requested channels is sent in response to a request operation on wireless terminal 15 performed by the user. This notification is sent in the viewing request message illustrated in FIG. 8.

When the user is currently viewing a broadcast program, the user may then request for a program different from the current one, or cancel the current request for a program, or request no program. When the user requests no program, the user can be considered to be requesting the program he is now watching.

Figure 10:
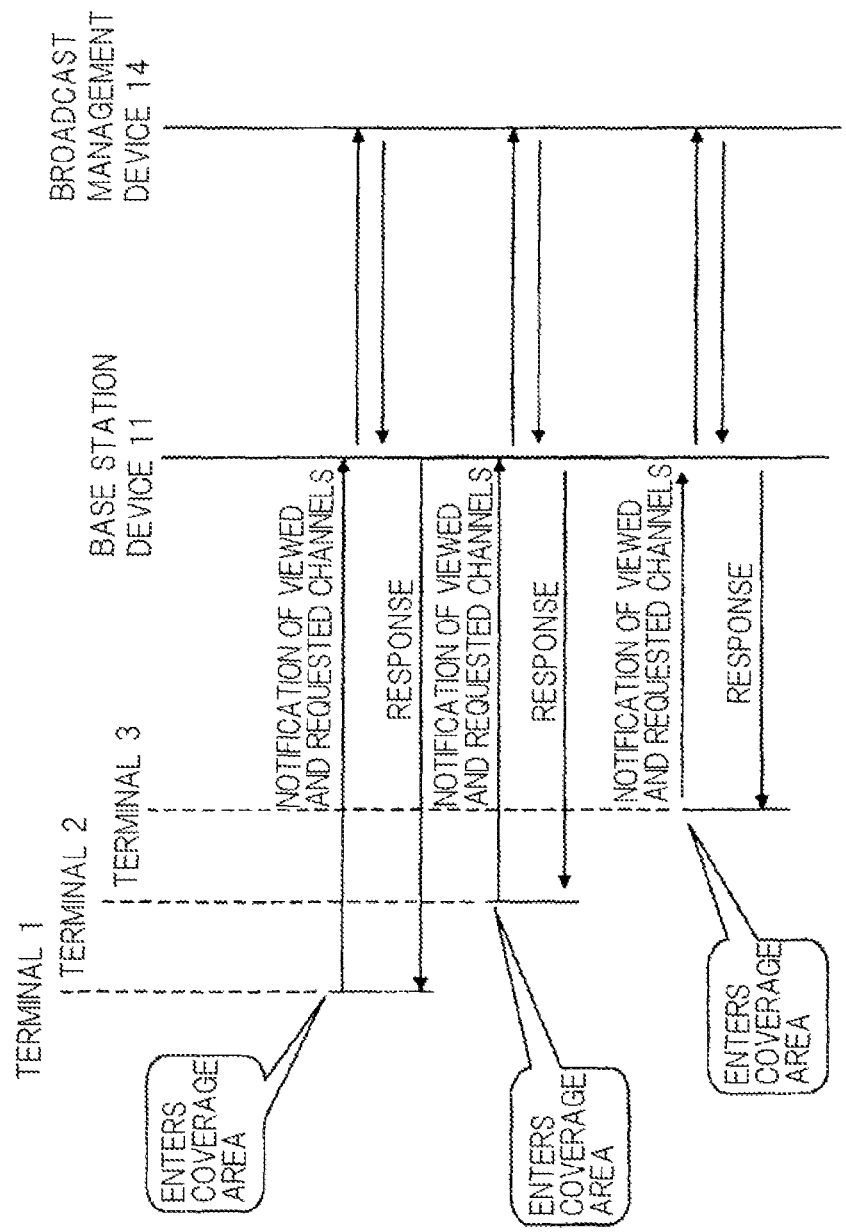
FIG. 10 shows an example of a signal sequence between a wireless terminal and a base station device that takes place when a wireless terminal viewing a broadcast program enters a coverage area of a base station device.

FIG. 10 is an example of a signal sequence between a wireless terminal and a base station device that takes place when a wireless terminal on which a broadcast program is being viewed enters the coverage area of a base station device. A similar sequence will be also performed when a wireless terminal that has not been viewing a broadcast program starts viewing a broadcast program. Referring to FIG. 10, upon entering the area, wireless terminals 1 to 3 send notification of their viewed and requested channels. Notification of viewed and requested channels is transferred in the viewing request message shown in FIG. 8.

When wireless terminal 15 enters the coverage area of base station device 11 from outside of the area, the channel of a program that is now being viewed on the terminal is reported as its viewed channel and the channel of a program that is currently being requested by the terminal is reported as its requested channel. Wireless terminal 15 automatically sends a viewing request message without requiring the user to perform an operation on wireless terminal 15.

If a program that was not broadcast in the coverage area of base station device 11 in which wireless terminal 15 was previously positioned and which the user was requesting is broadcast in the coverage area of base station device 11 which wireless terminal 15 has newly entered, wireless terminal 15 may automatically change the viewed channel. Wireless terminal 15 may also indicate to the user that the program the user has requested is now available for viewing through display, sound output, or vibration. This allows the user to automatically start viewing a desired broadcast program without being aware of travel between base station devices 11.

When the user of wireless terminal 15 who has not been viewing a program starts viewing a broadcast program, wireless terminal 15 transfers a message indicating viewed and requested channels as soon as or upon elapse of a certain time period after the user selects a program to receive and wireless terminal 15 starts receiving operations.

Figure 11:
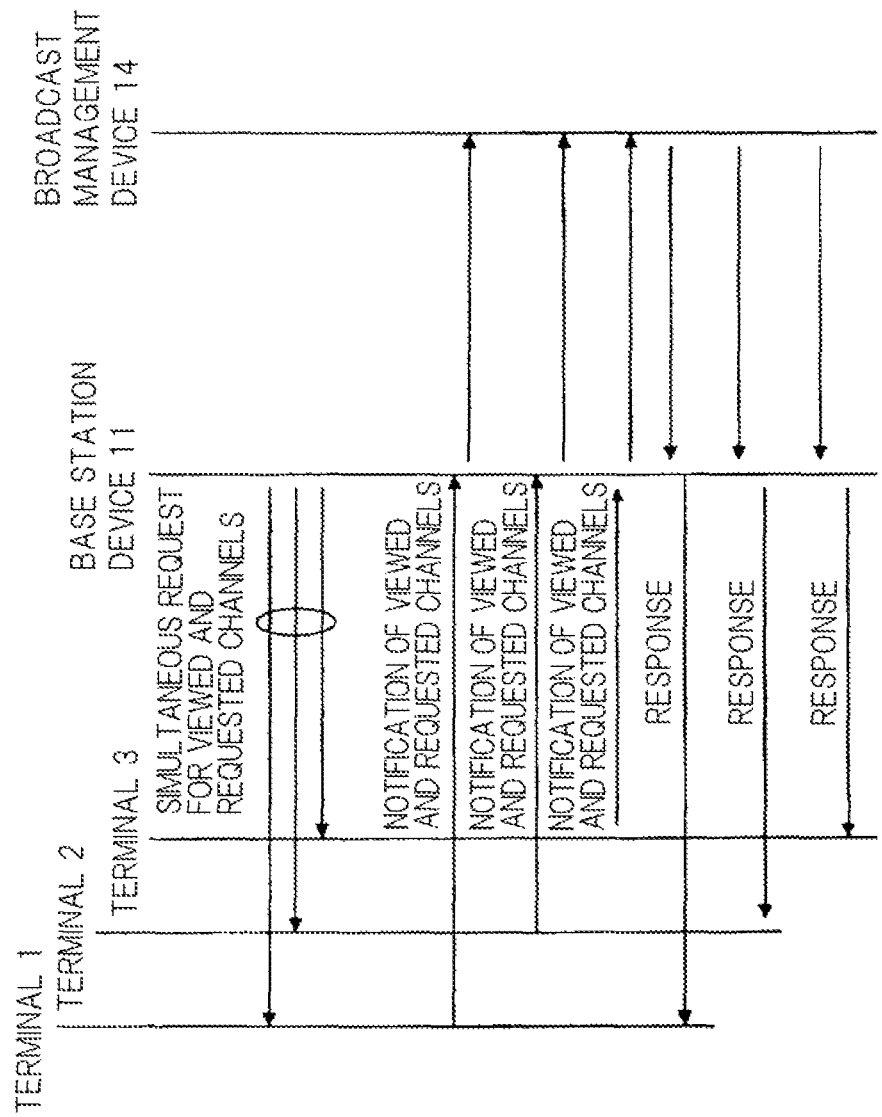
FIG. 11 shows a signal sequence for collecting information on viewed and requested channels by the system requesting wireless terminals in the coverage area of the base station device to send such information.

FIG. 11 shows a signal sequence for collecting information on viewed and requested channels by the system requesting wireless terminals in the coverage area of the base station device to send such information. In this example, base station device 11 sends a simultaneous request message using a common channel which can be received by wireless terminals 15, in response to which wireless terminals 1 to 3 send their respective viewed and requested channels to broadcast management device 14 via base station device 11.

To avoid the occurrence of congestion on base station device 11 or broadcast management device 14 with messages from wireless terminals 15, wireless terminals 15 in the coverage area of base station device 11 may be divided into some groups and a simultaneous request message may be sent to each of the groups at different times.

FIG. 12 shows an illustrative program viewing and requesting states on each of the wireless terminals that are present in the coverage area of a base station device at a certain time. It is assumed here that programs on four channels 1 to 4 can be broadcast in the coverage area of base station device 15 and that programs actually being broadcast are channels 1 and 4, and that programs channels 2 and 3 are not being broadcast.

For example, wireless terminals 15 having a terminal ID from 1 to 19 are watching channel 1 and not requesting any other channel. Wireless terminals 15 having a terminal ID from 20 to 22 are watching channel 1 and requesting channel 2. This corresponds to a situation in which a user really wants to view channel 2 but is viewing channel 1 because channel 2 is not broadcast, for example. Wireless terminal 15 having a terminal ID of 26 is viewing channel 1 and requesting channel 4. This represents a situation where the user actually wants to view channel 4 but is temporarily watching channel 1, for example. Wireless terminals 15 having a terminal ID from 51 to 55 are not viewing any program and are requesting channel 2.

Figure 13:
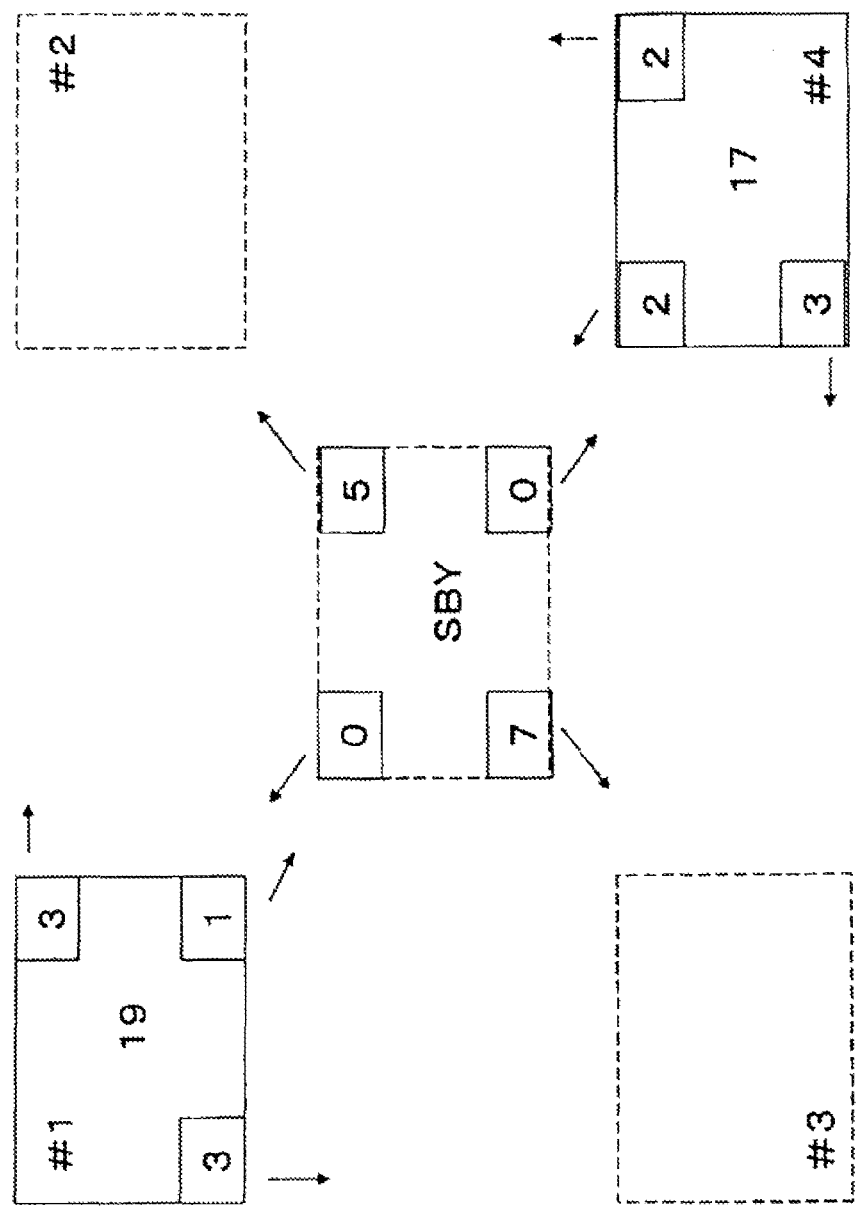
FIG. 13 schematically illustrates the state of FIG. 12.

FIG. 13 is a schematic representation of the situation of FIG. 12, where the four programs being able to be broadcast are indicated as boxes #1 to #4. A solid-line box represents a program that is actually being broadcast and a broken-line box represents a program not in service. Programs #1 and #4 are being broadcast, and #2 and #3 are not.

The #1 box shows that there are nineteen wireless terminals 15 that are viewing program #1 and are not requesting other program. Also, three wireless terminals 15 are viewing the #1 program and requesting the #2 programs. Three wireless terminals 15 are viewing the #1 program and requesting the #3 program. One wireless terminal 15 is viewing the #1 program and requesting the #4 program.

Similarly, in the #4 box, it can be seen that there are seventeen wireless terminals 15 that are viewing the #4 program and are not requesting other programs. Two wireless terminals 15 are viewing the #4 program and requesting the #2 program. Three wireless terminals 15 are viewing the #4 program and requesting the #3 program. Two wireless terminals 15 are viewing the #4 program and requesting the #1 program.

Referring to the broken-line box in the center, there are five wireless terminals 15 that are viewing no program and requesting the #2 program. Seven wireless terminals are viewing no program and requesting the #3 program.

Figure 14:
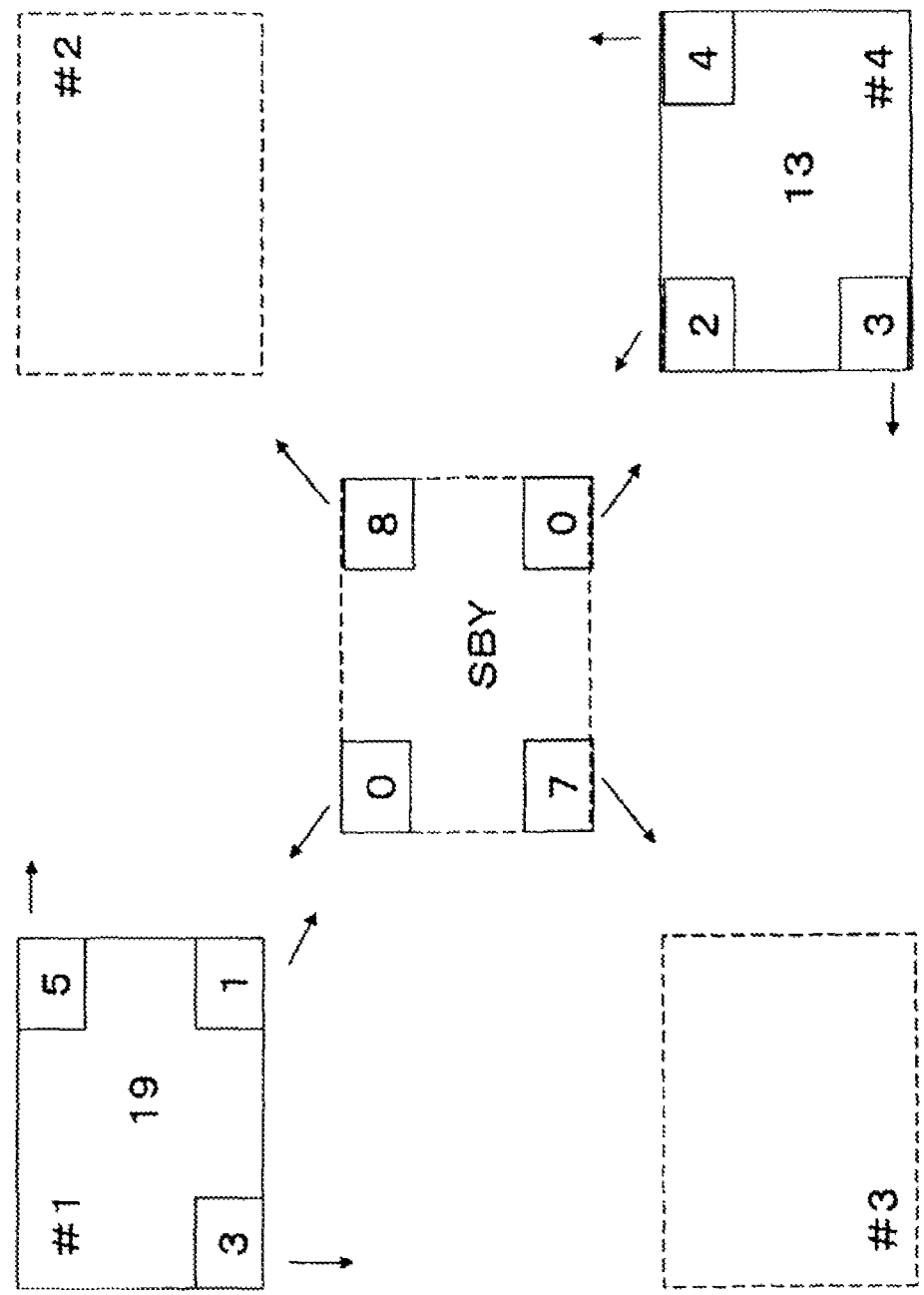
FIG. 14 shows a state after elapse of a certain time from the state of FIG. 13.

FIG. 14 shows a situation after elapse of a certain time from the situation of FIG. 13.

For example, in the #1 box, there are nineteen wireless terminals 15 that are viewing the #1 program and not requesting any other program, which remains unchanged from the situation of FIG. 13. However, the number of wireless terminals 15 that are viewing the #1 program and requesting the #2 program has increased to five.

Similarly, in #4, wireless terminals 15 that are viewing the #4 program and that are not requesting other program have decreased to thirteen. Also, wireless terminals 15 that are viewing the #4 program and requesting the #2 program have increased to four.

FIG. 15 is a tabular representation of the situation shown in FIG. 13. FIG. 16 is a table that re-sorts the table of FIG. 15.

Referring to FIG. 16, the #1 program is being viewed and requested on nineteen wireless terminals 15. The #1 program is requested by two wireless terminals 15 that are viewing the #4 program.

The #2 program is requested by three wireless terminals 15 viewing the #1 program, two wireless terminals 15 viewing the #4 program, and five wireless terminals 15 not viewing any program.

The #3 program is requested by three wireless terminals 15 viewing the #1 program, three wireless terminals 15 viewing the #4 program, and seven wireless terminals 15 not viewing any program.

The #4 program is being viewed and requested on seventeen wireless terminals 15. The #4 program is also requested by one wireless terminal 15 that is viewing the #1 program.

FIG. 17 is a tabular representation of the situation shown in FIG. 13. FIG. 18 is a table that re-sorts the table of FIG. 17.

Referring to FIG. 18, the #1 program is being viewed and requested on nineteen wireless terminals 15. The #1 program is also requested by two wireless terminals 15 that are viewing the #4 program.

The #2 program is requested by five wireless terminals 15 viewing the #1 program, four wireless terminals 15 viewing the #4 program, and eight wireless terminals 15 not viewing any program.

The #3 program is requested by three wireless terminals 15 viewing the #1 program, three wireless terminals 15 viewing the #4 program, and seven wireless terminals 15 not viewing any program.

The #4 program is being viewed and requested on thirteen wireless terminals 15. The #4 program is also being requested by one wireless terminal 15 viewing the #1 program.

In this exemplary embodiment, the score of each program is calculated according to Equation (1):

$$\text{Score} = \text{(the number of views)} + \text{(the number of requests)} - \text{(the number of other-channel requests)} \quad (1)$$

The number of views is the number of wireless terminals 15 that are actually viewing the program of interest. The number of requests is the number of wireless terminals 15 that are requesting the program. The number of other-channel requests is the number of wireless terminals 15 that are viewing the program and also requesting another program.

The score serves as an index to indicate which program is desired for viewing, whether actually watched by the users of wireless terminals 15 or not. By selecting programs based on the score, it is possible to select and broadcast programs that are truly requested.

FIG. 19 is a diagram illustrating the process of calculating the score of each program in the situation of FIG. 13 (and FIGS. 15, 16). FIG. 20 is a diagram illustrating the process of calculating the score of each program in the situation of FIG. 14 (and FIGS. 17, 18).

In the situation of FIG. 13, for example, the number of views is the sum of the numbers of reports in FIG. 15 in the column direction. The number of requests is the number of reports that are requesting the program of interest minus the number of reports from wireless terminals 15 that are viewing that program, which are shown in FIG. 16. The number of other-channel requests is the number of reports requesting other programs among reports from wireless terminals 15 that are viewing the program, which is shown in FIG. 15.

The score calculated with Equation (1) indicates users of how many wireless terminals 15 request each program for viewing. Broadcast management device 14 selects programs to broadcast on wireless channels starting with a program that is requested by the most users for viewing.

More specifically, suppose that viewing and requesting states at a certain time are analyzed as shown in FIGS. 15 and 16, and scores are calculated as illustrated in FIG. 19. At this point, the scores of the #1, #2, #3 and #4 programs are 21, 10, 13, and 18, respectively.

Then, when a certain time has elapsed, the situation is analyzed as illustrated in FIGS. 17, 18 and scores are calculated as shown in FIG. 20. At this point, the score of the #2 program has increased to 17 and the score of the #4 program has decreased to 14. As a result, the scores of the #2 and #4 programs have been reversed: now the #2 is getting more viewing requests than the #4 program. Broadcast management device 14 then makes a switch so as to stop broadcasting the #4 program and start broadcasting the #2 program instead.

FIG. 21 shows an example of notice information provided to wireless terminals. Notice information contains channel number (Ch_No.), program title (Program_Name), broadcast status (Status), score (Score), and broadcast switching time (Action_Time), for each program.

In the notice information shown in the figure, the same scores as those of FIG. 19 which are calculated for the situation shown in FIG. 13 are described. Specifically, a baseball game is being broadcast on Ch#1 and the score of the program is 21. Ch#2 is broadcasting a soccer game, but the program is not being broadcast on a wireless channel and has a score of 10. Ch#3 is broadcasting a tennis match, but the program is not being broadcast on a wireless channel and has a score of 13. On Ch#4, wrestling is being broadcast and the score of the program is 18.

FIG. 22 shows an example of notice information that is sent to wireless terminals upon elapse of a certain time from the situation of FIG. 21.

In the notice information of FIG. 22, the same scores as those shown in FIG. 20 which are calculated for the situation of FIG. 14 are described. Specifically, a baseball game is being broadcast on Ch#1 and the program has a score of 21. Ch#2 is soccer, but the program is not being broadcast and the score of the program is 17. Ch#3 is tennis, but the program is not being broadcast and the score of the program is 13. On Ch#4, a wrestling match is being broadcast and the score of the program is 14.

At this point, the score of Ch#2 (17) which is not being broadcast is greater than the score of Ch#4 (14) which is being broadcast. Accordingly, broadcast management device 14 has decided to switch programs. The notice information of FIG. 22 indicates the amount of time before the change in Action_Time to give an advance notice of the change. In the example of FIG. 22, the amount of time before switching is 120 seconds.

In this exemplary embodiment, it is assumed that wireless terminal 15 has functions to specify a program currently being broadcast that the user wants to watch or a program that is not being broadcast but the user wants to watch such as by scrolling through icons on a screen and notify broadcast management device 14 of the program.

FIG. 23 shows an example of a screen display on a wireless terminal that has received the notice information of FIG. 21. The screen of the figure displays channel number (Ch_No.), current broadcast status (Status), program title (Program_Name), score (Score), and requested program indication (Req), for each program. A program with "R" indicated in a requested program indication is a program requested by the user of wireless terminal 15. In the example of FIG. 23, Ch#2 is requested.

FIG. 24 shows an example of a screen display on a wireless terminal that has received the notice information of FIG. 22. In the screen of FIG. 24, the same items as in FIG. 23 are displayed. The user is still requesting Ch#2 at this point, "R" being indicated with Ch#2. Also, the broadcast status of Ch#2 is indicated as "Beginning". This means broadcast on the wireless channel for Ch#2 is being started. The broadcast status of Ch#4 is indicated as "Completing". This means broadcast on Ch#4 is being terminated. By seeing the indication, the user can recognize that broadcast of a program that the user is requesting is now starting. Also, a user watching a program on Ch#4 recognizes that broadcast on Ch#4 he is watching is going to end.

Figure 25:
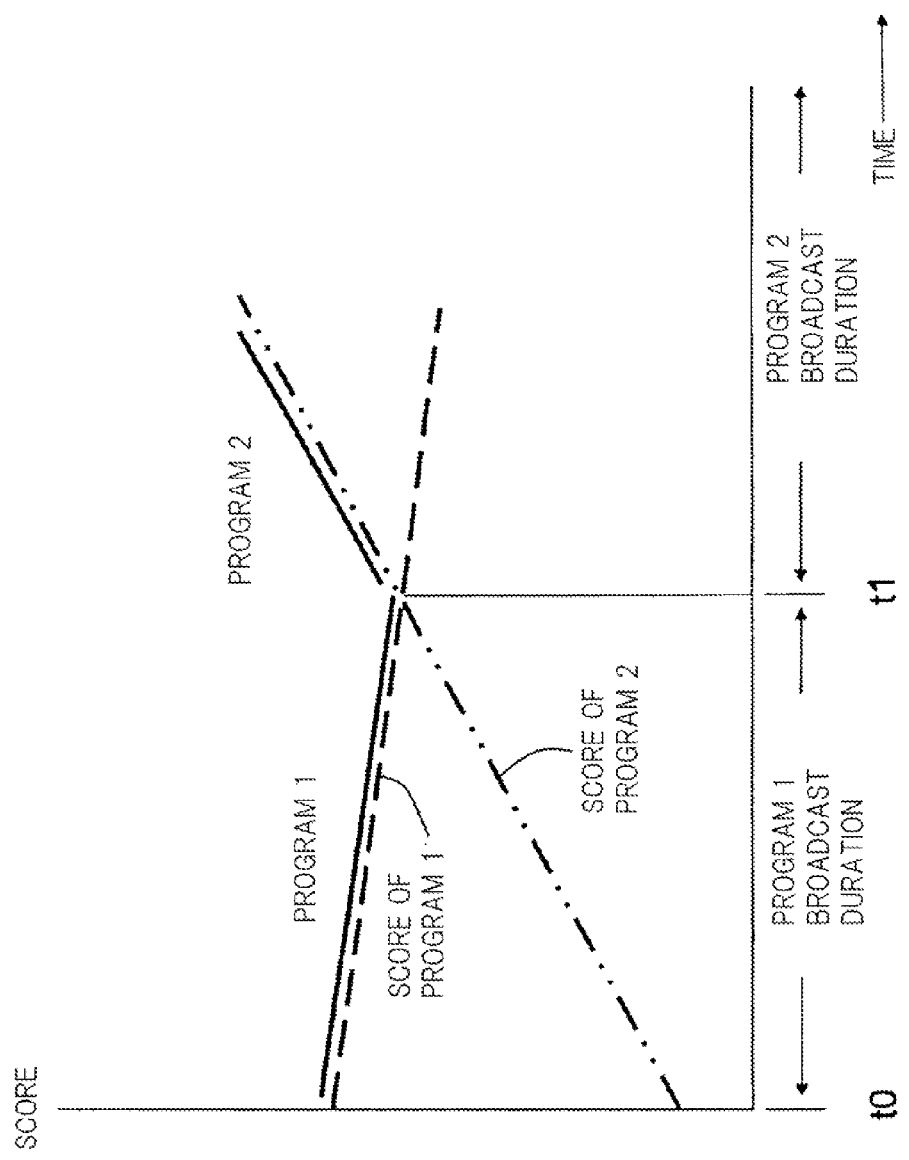
FIG. 25 illustrates a switch of programs being broadcast on wireless channels.

FIG. 25 illustrates a switch of programs broadcast on wireless channels. In the figure, the vertical axis represents score and the horizontal axis represents time. Broken lines indicate scores of programs. At time t0, the score of program 1 is greater than the score of program 2. However, at time t1, the score of program 2 becomes equal to that of program 1, and from then on the score of program 2 exceeds the score of program 1. At first, program 1 is broadcast and program 2 is not, and from time t1 on, program 2 is broadcast in place of program 1.

In selection of programs to broadcast on wireless channels, protection for preventing frequent switch may be applied.

Figure 26:
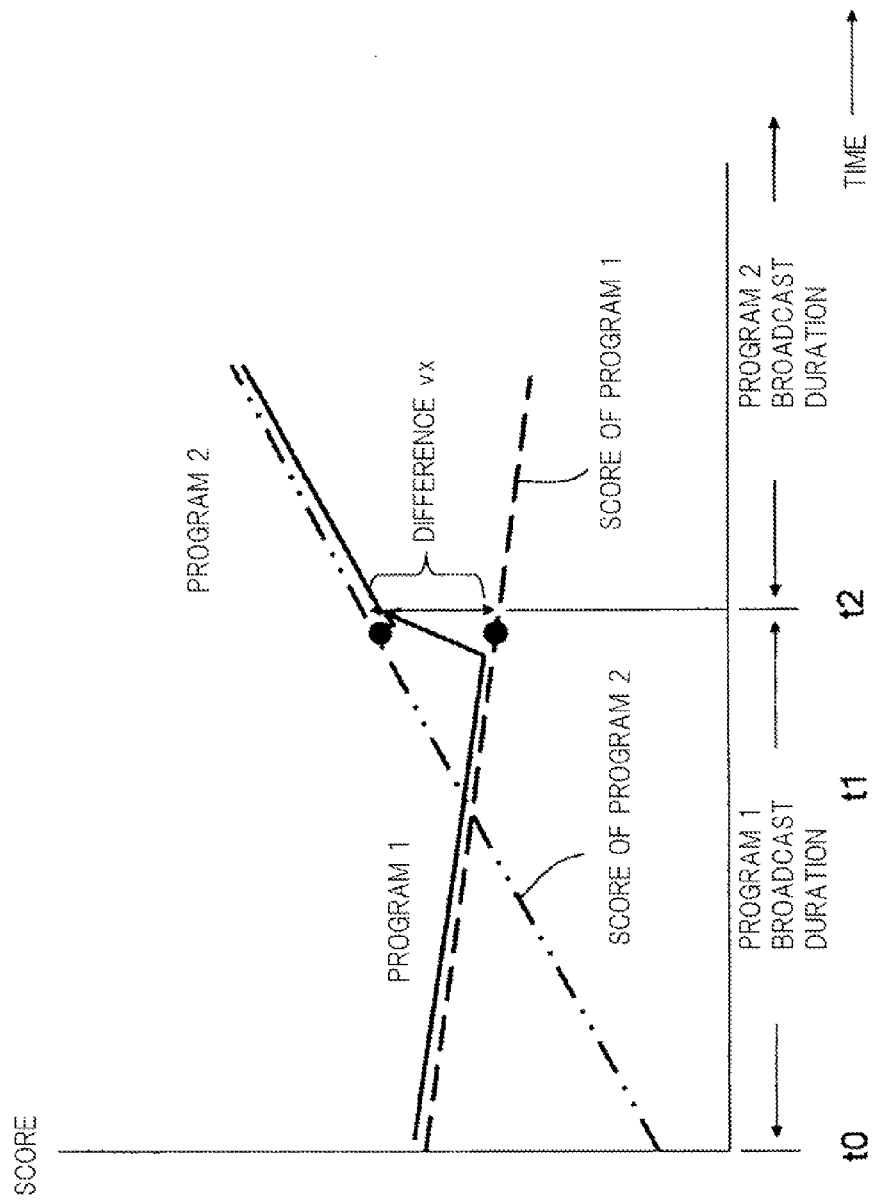
FIG. 26 is a diagram illustrating a switching of programs with score protection applied.

FIG. 26 is a diagram illustrating switching of programs with score protection applied. Referring to FIG. 26, change in scores of programs 1 and 2 over time is the same as in FIG. 25. In this example, however, switching of programs is effected at the time when the score of program 2 has exceeded the score of program 1 by a protection value (a difference vx) (t2), rather than at the time when the scores of programs 1 and 2 have been reversed (t1). The difference vx may be arbitrarily set.

Figure 27:
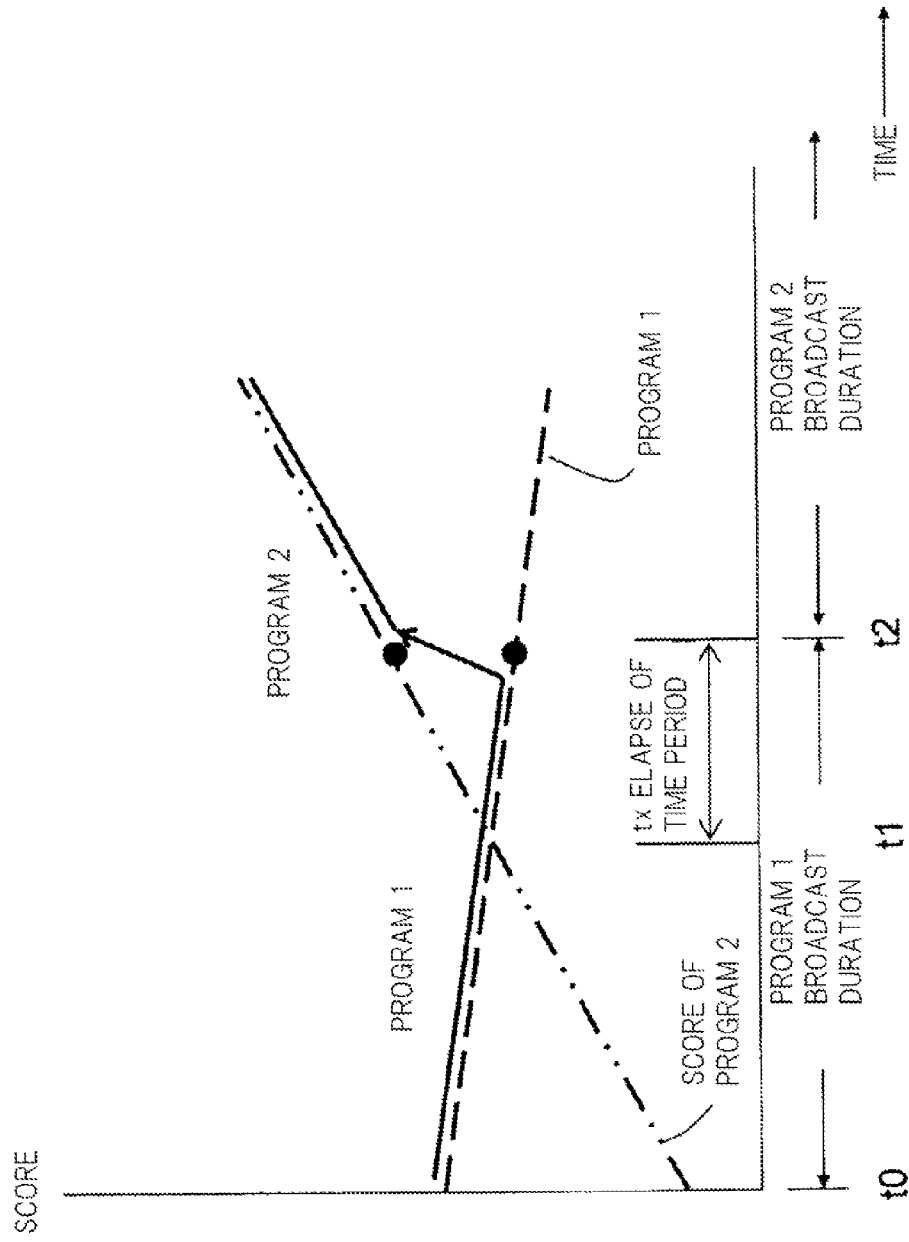
FIG. 27 is a diagram illustrating a switching of programs with time protection applied.

FIG. 27 is a diagram illustrating switching of programs with time protection applied. Referring to FIG. 27, change in scores of programs 1 and 2 over time is the same as in FIG. 25. In this example, however, the switching of programs takes place at the time when the score of program 2 has been continuously greater than the score of program 1 for a protection time (a time period tx) (t2) rather than when the scores of the programs 1 and 2 have been reversed (t1). This can prevent too frequent switching and also allow notification of a switch of programs to the user so that the user can anticipate it. Time period tx may be arbitrarily defined.

Figure 28:
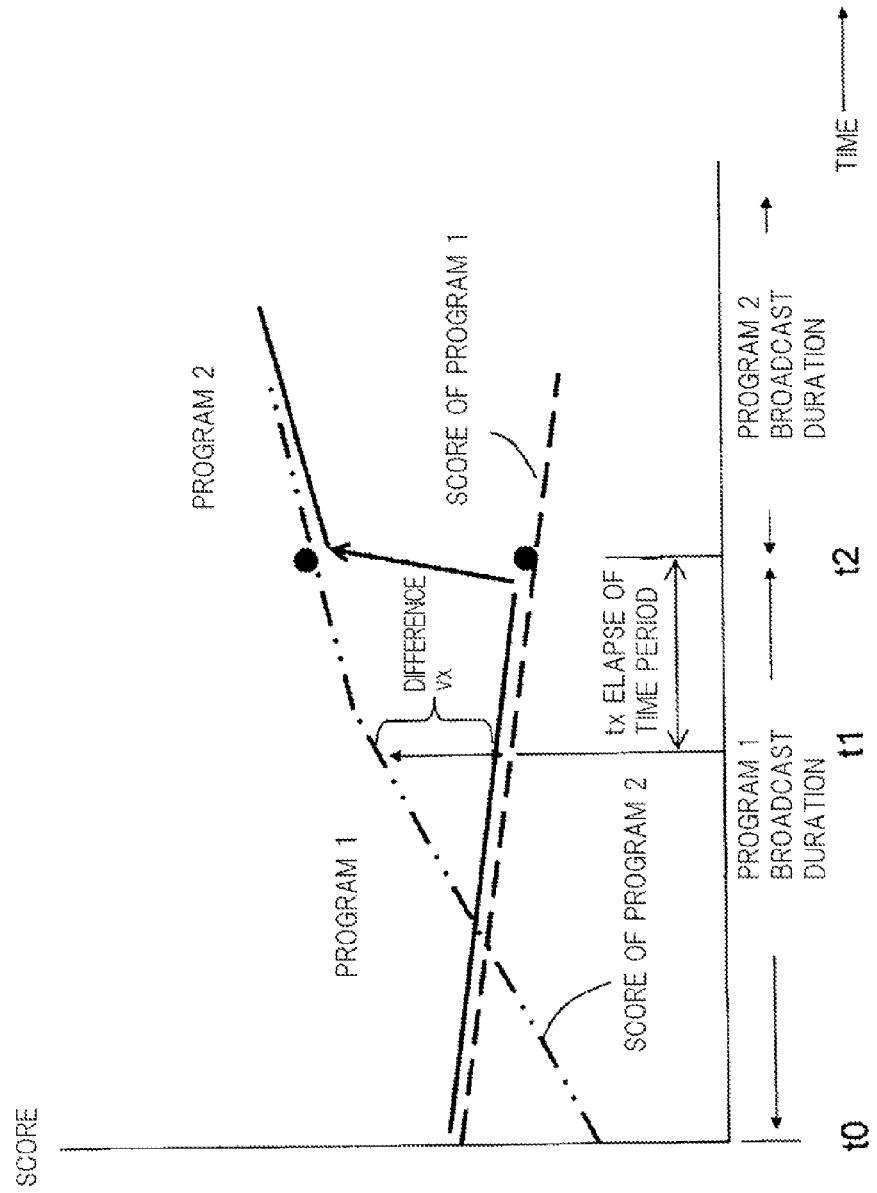
FIG. 28 is a diagram illustrating a switching of programs with both score and time protections applied.

FIG. 28 is a diagram illustrating switching of programs with both score protection and time protection applied. Referring to FIG. 28, at time t1, the score of program 2 exceeds the score of program 1 by a difference vx. However, switching of programs is not effected at this point. Rather, programs are switched at a time when the score of program 2 is greater than the score of program 1 by the difference vx or greater for the time period tx (t2).

FIG. 29 is a diagram illustrating a case where switching of programs does not occur as a result of applying time protection. Suppose that such time protection as described in FIG. 27 is applied to switching of programs. Referring to FIG. 29, the scores of programs 1 and 2 are reversed at time t1. But at time t2, which is a time point before elapse of time period tx from time t1, the scores of programs 1 and 2 are reversed again. Thus, programs broadcast on wireless channels are not changed.

While the exemplary embodiments described so far illustrate a broadcast system utilizing wireless lines, the present invention is not limited to such a configuration. The invention is also applicable to a broadcast system based on wired lines. In addition, a communication channel used for transmitting broadcast content data and notice information including each of the program scores does not have to be identical with a communication channel used for transmitting requests from terminals and terminal-specific information containing responses to the requests. Wired and wireless communication channels can be used as appropriate. To be specific, communication channels can be selectively used according to the following patterns:

(1) Use wireless channels for both transfer of broadcast content and notice information, and transfer of terminal-specific information;

(2) Use wireless channels for transfer of broadcast content and notice information, and wired channels for transfer of terminal-specific information;

(3) Use wired channels for transfer of broadcast content and notice information, and wired channels for transfer of terminal-specific information; or (4) Use wired channels for transfer of broadcast content and notice information, and wireless channels for transfer of terminal-specific information.

Because program content data and notice information distributed by broadcast device 13 both have high simultaneity, they are preferably transferred on channels of the same type. On the other hand, because requests from terminals and responses to the requests are more discrete, they do not have to be transferred on channels of the same type as program content.

In the case of (2), such a system is conceivable where terrestrial digital broadcasting is received on terminals (or televisions) installed in homes and viewers' requests are summarized to be reflected in the selection of broadcast programs. For example, in FIG. 1, program content data and notice information distributed by broadcast device 13 may be transmitted on wireless channels and request information to be sent to broadcast management device 14 may be transmitted on wired channels of a wired network (not shown).

FIG. 30 illustrates signal transfer with wireless channels used for both transfer of broadcast content and notice information, and transfer of terminal-specific information, which corresponds to (1). In the figure, a solid-line arrow represents signal transfer on a wired channel, and a broken-line arrow represents signal transfer on a wireless channel. In this example, a wireless channel is used as a broadcast/notice information channel (a common channel) for transferring broadcast content and notice information, which have high simultaneity. A wireless channel is also used for a terminal-specific information transfer channel (an individual channel) for transferring viewing request messages and responses to the messages, which are more discrete.

FIG. 31 illustrates signal transfer using wireless channels for transfer of broadcast content and notice information, and wired channels for transfer of terminal-specific information, which corresponds to (2) above. Again, a solid-line arrow represents signal transfer on a wired channel and a broken-line arrow represents signal transfer on a wireless channel. In this example, a wireless channel is used as broadcast/notice information channel for transferring broadcast content and notice information, which have high simultaneity. Meanwhile, a wired channel is also used as a terminal-specific information transfer channel for transferring viewing request messages and responses to the messages, which are more discrete.

In addition, terminals used with the present invention are not limited to mobile terminals, but may be fixedly-installed terminals (fixed terminals), whether wired or wireless. In the case of a fixed terminal, entry to an area shown in FIG. 8 is not relevant, but similar operations to the sequence shown in FIG. 8 take place upon power-up of the terminal, which is relevant to both mobile and fixed terminals.

While the present invention has been described with reference to the exemplary embodiments thereof, the invention is not limited to the embodiments. Rather, various modifications comprehensible to those skilled in the art may be made to the constitution or details of the invention as defined in the claims without departing from the scope of the invention.

The invention claimed is:

1. A broadcast management device that manages programs to be broadcast in a broadcast system which assigns a communication channel to a program and broadcasts data for the program into a communication area which can accommodate a plurality of terminals, the broadcast management device comprising:

a score calculator that calculates in a real-time manner as a score a measure of viewing requests from a plurality of users of the respective terminals for a program that is actually being broadcast on the communication channel and a program that is not being actually broadcast but can be broadcast; and a determination unit that updates in a real-time manner the program to be actually broadcast on the communication channel by selecting from among the program that is being actually broadcast on the communication channel and a program that is not actually being broadcast but can be broadcast based on the score calculated by the score calculator.

2. The broadcast management device according to claim 1, wherein the score calculator summarizes users' viewing requests for programs which are sent from the plurality of the terminals, and counts the score of each of the programs based on the result of summarization.

3. The broadcast management device according to claim 2, wherein the request information includes information indicating a program that is being actually viewed on the terminals and information indicating a program that is requested by the users of the terminals for viewing, and when counting the score of the program, the score calculator takes into account both that the program is being actually viewed and that the program is requested for viewing even if the program is not being viewed.

4. The broadcast management device according to claim 3, wherein for each one of the programs, the score calculator adds a number of terminals on which the program is being actually viewed to the number of terminals on which the program is not being actually viewed but is requested for viewing, and subtracts the number of terminals on which the program is being actually viewed but on which viewing of another program is requested from the result of addition so as to calculate the score.

5. The broadcast management device according to claim 1, wherein the determination unit determines to change the program to be broadcast when the score of a program that is not being broadcast has exceeded the sum of the score of a program that is currently being broadcast and a predetermined protection value.

6. The broadcast management device according to claim 1, wherein the broadcast management device changes the program to be broadcast when the result of comparing the score of a program that is not being broadcast with the score of a program that is currently being broadcast has continuously satisfied a predetermined condition for a predetermined protection time period or longer.

7. A broadcast management device that manages programs to be broadcast in a broadcast system which assigns a communication channel to a program and broadcasts data for the program into a communication area which can accommodate a plurality of terminals, the broadcast management device comprising:

a score calculator that calculates as a score a measure of viewing requests from a plurality of users of the respective terminals for a program that is actually being broadcast on the communication channel and a program that is not being actually broadcast but can be broadcast; and a determination unit that updates the program to be actually broadcast on the communication channel by selecting from among the program that is being actually broadcast on the communication channel and a program that is not actually being broadcast but can be broadcast based on the score calculated by the score calculator, wherein, the score calculator summarizes users' viewing requests for programs which are sent from the plurality of the terminals, and counts the score of each of the programs based on the result of summarization; and the broadcast management device farther comprising means for notifying the terminals of the scores of the programs calculated by the score calculator as notice information.

8. The broadcast management device according to claim 7, wherein the notification unit notifies the terminals of the calculated scores of the programs as notice information in a real-time manner.

9. The broadcast management device according to claim 7, wherein the request information includes information indicating a program that is being actually viewed on the terminals and information indicating a program that is requested by the users of the terminals for viewing, and when counting the score of the program, the score calculator takes into account both that the program is being actually viewed and that the program is requested for viewing even if the program is not being viewed.

10. The broadcast management device according to claim 9, wherein for each one of the programs, the score calculator adds a number of terminals on which the program is being actually viewed to the number of terminals on which the program is not being actually viewed but is requested for viewing, and subtracts the number of terminals on which the program is being actually viewed but on which viewing of another program is requested from the result of addition so as to calculate the score.

11. The broadcast management device according to claim 7, wherein the determination unit determines to change the program to be broadcast when the score of a program that is not being broadcast has exceeded the sum of the score of a program that is currently being broadcast and a predetermined protection value.

12. The broadcast management device according to claim 7, wherein the broadcast management device changes the program to be broadcast when the result of comparing the score of a program that is not being broadcast with the score of a program that is currently being broadcast has continuously satisfied a predetermined condition for a predetermined protection time period or longer.

* * * * *